United States Patent
Brannan et al.

(10) Patent No.: US 12,373,892 B1
(45) Date of Patent: Jul. 29, 2025

(54) SYSTEMS AND METHODS FOR GENERATING ON-DEMAND PRODUCTS RESPONSIVE TO REAL-TIME GEOLOCATION AND TELEMATICS

(71) Applicant: State Farm Mutual Automobile Insurance Company, Bloomington, IL (US)

(72) Inventors: Joseph Robert Brannan, Bloomington, IL (US); Brian N. Harvey, Bloomington, IL (US); Darwin Gene Beachy, Hopedale, IL (US); Matthew Eric Riley, Sr., Heyworth, IL (US); Benjamin Joel Tucker, Le Roy, IL (US); Michael Aaron Myers, Heyworth, IL (US); Ryan Michael Gross, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/190,928

(22) Filed: Mar. 3, 2021

Related U.S. Application Data

(60) Provisional application No. 62/985,169, filed on Mar. 4, 2020.

(51) Int. Cl.
*G06Q 40/08* (2012.01)
*G06Q 30/0204* (2023.01)
*H04W 4/021* (2018.01)

(52) U.S. Cl.
CPC ......... *G06Q 40/08* (2013.01); *G06Q 30/0205* (2013.01); *H04W 4/021* (2013.01)

(58) Field of Classification Search
None
See application file for complete search history.

(56) References Cited

U.S. PATENT DOCUMENTS 8,467,807 B1 * 6/2013 Dalit ............... H04W 4/021
725/23
8,892,451 B2 * 11/2014 Everett ............ G06Q 10/0833
340/576

(Continued)

FOREIGN PATENT DOCUMENTS

EP       3239686 A1   11/2017
EP       3578433 B1    8/2020

(Continued)

OTHER PUBLICATIONS

Ermolieva, T., Filatova, T., Ermoliev, Y., Obersteiner, M., Bruijn, K. M., & Jeuken, A. (2017). Flood catastrophe model for designing optimal flood insurance program: Estimating location-specific premiums in the netherlands. Risk Analysis, 37(1), 82-98. doi:http://dx.doi.org/ 10.1111/risa.12589 on Jan. 20, 2023 (Year: 2017).*

(Continued)

*Primary Examiner* — Bruce I Ebersman
(74) *Attorney, Agent, or Firm* — Armstrong Teasdale LLP

(57) ABSTRACT

A computing device for generating on-demand products based upon real-time geolocation data is configured to receive and store at least one product definition associated with a respective product. Each product definition defines an availability of the product and includes a product availability location. The computing device is also configured to receive real-time location data from a user computing device, and periodically query a memory device with the real-time location data. The computing device detects that the user computing device has entered a first location by retrieving, in response to a successful query of the memory device, a first product definition associated with a first product having (Continued)

a product availability location including the first location. The computing device is also configured to generate a product identification message including at least a portion of the first product definition, and transmit the product identification message to the user computing device.

20 Claims, 9 Drawing Sheets

(56) References Cited

U.S. PATENT DOCUMENTS

| | | | |
|---|---|---|---|
| 8,909,248 B2 * | 12/2014 | Phillips | G08B 21/0261 |
| | | | 455/414.1 |
| 9,311,271 B2 | 4/2016 | Wright | |
| 9,633,487 B2 | 4/2017 | Wright | |
| 9,830,748 B2 | 11/2017 | Rosenbaum | |
| 9,990,782 B2 | 6/2018 | Rosenbaum | |
| 10,019,904 B1 | 7/2018 | Chan | |
| 10,192,369 B2 | 1/2019 | Wright | |
| 10,198,879 B2 | 2/2019 | Wright | |
| 10,217,169 B2 * | 2/2019 | Schumann, Jr. | |
| | | | G08G 1/096775 |
| 10,223,744 B2 * | 3/2019 | Brady | G06Q 40/02 |
| 10,269,190 B2 | 4/2019 | Rosenbaum | |
| 10,295,356 B1 | 5/2019 | Cope et al. | |
| 10,430,883 B1 | 10/2019 | Bischoff et al. | |
| 10,467,824 B2 | 11/2019 | Rosenbaum | |
| 10,490,078 B1 | 11/2019 | Fields et al. | |
| 10,493,994 B1 | 12/2019 | Fields | |
| 10,540,723 B1 | 1/2020 | Potter et al. | |
| 10,582,354 B1 * | 3/2020 | Isaac | G08G 1/127 |
| 10,586,288 B2 | 3/2020 | Biemer et al. | |
| 10,633,001 B2 | 4/2020 | Ferguson | |
| 10,672,078 B1 * | 6/2020 | Tagny Diesse | G06Q 40/08 |
| 10,916,075 B1 * | 2/2021 | Webster | G06Q 40/08 |
| 11,042,938 B1 * | 6/2021 | Robare | G06Q 40/08 |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 2003/0100993 A1 * | 5/2003 | Kirshenbaum | G01C 21/26 |
| | | | 701/408 |
| 2004/0039661 A1 * | 2/2004 | Fuzell-Casey | G06Q 30/0224 |
| | | | 705/26.81 |
| 2011/0161116 A1 | 6/2011 | Peak et al. | |
| 2013/0222133 A1 * | 8/2013 | Schultz | H04W 4/21 |
| | | | 340/539.11 |
| 2014/0108058 A1 | 4/2014 | Bourne | |
| 2014/0278837 A1 | 9/2014 | Blumer | |
| 2014/0365246 A1 | 12/2014 | Hayward | |
| 2015/0142313 A1 | 5/2015 | Haberman | |
| 2015/0163626 A1 * | 6/2015 | Zimmer | H04W 4/029 |
| | | | 455/404.2 |
| 2015/0213518 A1 | 7/2015 | Krishnamurthy | |
| 2016/0171521 A1 | 6/2016 | Ramirez et al. | |
| 2016/0223348 A1 | 8/2016 | Witte et al. | |
| 2017/0365169 A1 | 12/2017 | Tennent | |
| 2018/0080777 A1 | 3/2018 | Nimchuk et al. | |
| 2018/0330318 A1 * | 11/2018 | Alaparthy | G06Q 10/087 |
| 2019/0005812 A1 * | 1/2019 | Matus | G06V 20/584 |
| 2019/0147538 A1 | 5/2019 | Duan | |
| 2019/0375416 A1 | 12/2019 | Rau | |
| 2020/0074326 A1 | 3/2020 | Balakrishnan | |
| 2020/0086882 A1 | 3/2020 | Kodali | |
| 2021/0133886 A1 * | 5/2021 | Williams | G06Q 40/08 |
| 2021/0264536 A1 * | 8/2021 | Dahl | G07C 5/0816 |
| 2021/0295443 A1 | 9/2021 | Webster | |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

OTHER PUBLICATIONS

Pitney bowes MapInfo: Pitney bowes MapInfo aligns with exclusive analysis to provide advanced terrorism risk analytics; TerrorRisk(tm) enables insurers to conduct enhanced strategic planning through location-specific terrorism risk exposure. (Sep. 10, 2007). M2 Presswire Retrieved from https://dialog.proquest.com/professional/docview/444633140?accountid=131444 (Year: 2007).*
A Cloud-Based Mobile Computing Applications Platform for First Responders, IEEE (Year: 2013).*
Large-Scale Geolocation for NetFlow, IEEE (Year: 2013).*

* cited by examiner

SYSTEMS AND METHODS FOR GENERATING ON-DEMAND PRODUCTS RESPONSIVE TO REAL-TIME GEOLOCATION AND TELEMATICS

CROSS-REFERENCE TO RELATED APPLICATIONS

This application claims the benefit of priority to U.S. Provisional Patent Application No. 62/985,169, filed Mar. 4, 2020, entitled "SYSTEMS AND METHODS FOR GENERATING ON-DEMAND PRODUCTS RESPONSIVE TO REAL-TIME GEOLOCATION AND TELEMATICS", the entire contents and disclosure of which are hereby incorporated by reference herein.

FIELD OF THE DISCLOSURE

The present disclosure generally relates to analyzing real-time geolocation and/or telematics data, and, more particularly, to systems and methods for generating on-demand products responsive to real-time geolocation telematics data.

BACKGROUND

Individuals use mobile devices (e.g., mobile telephones) for a variety of purposes and often carry mobile devices while traveling. Such usage may represent a source of data that is descriptive or representative of the individual's location and behavior. For example, mobile devices may be equipped to generate data (e.g., geolocation and/or telematics data) using instruments built into the mobile device, such as an accelerometer or global positioning system (GPS) device.

However, there are currently limitations in the ability of computing devices to utilize such data in automated processes. Specifically, geolocation and/or telematics data may need to be reconciled by human beings to be used in various applications, which may result in lack of timeliness, inaccuracies, inconvenience, and/or other drawbacks.

BRIEF SUMMARY

The present embodiments may relate to, inter alia, systems and methods for generating on-demand products responsive to real-time geolocation and/or telematics data. Specifically, based upon an individual's real-time location, as represented by the real-time geolocation and/or telematics data, various products can be generated and/or offered (e.g., pushed) to the individual. For example, certain products are only available in certain locations, such that when the individual enters a certain location, a product may be offered thereto (responsive to the individual entering that location, in real-time). Additionally or alternatively, environmental data (e.g., weather data, traffic data, crime data, accident data, etc.) may be incorporated into which products may be offered to an individual and/or when such products are offered. In some embodiments, the product may be an insurance policy, including a supplemental or add-on insurance policy, a short-term personal mobility policy, and/or an on-demand insurance policy. The product may be recommendations, alerts, and the like, such as carpool recommendations, weather event alerts, etc.

In one aspect, a computing device for generating on-demand products based upon real-time geolocation data may be provided. The computing device may include at least one processor and/or associated transceiver in communication with a memory device. The at least one processor and/or associated transceiver may be programmed to: (i) receive, from at least one product source, at least one product definition associated with a respective at least one product, wherein each at least one product definition defines an availability of the respective product, and includes a product availability location within which the product is available, (ii) store the at least one product definition in the memory device, (iii) receive, from a user computing device, real-time location data from at least one location sensor of the user computing device over an interval of time, the real-time location data including a respective location of the user computing device throughout the interval of time, (iv) periodically query, over the interval of time, the memory device with the real-time location data, (v) when the user computing device enters a first location, based upon the real-time location data, detect that the user computing device has entered the first location by retrieving, in response to a successful query of the memory device, a first product definition associated with a first product of the at least one product, wherein the first product has a product availability location including the first location, (vi) generate a product identification message including at least a portion of the first product definition, and/or (vii) transmit the product identification message to the user computing device, the product identification message including instructions for the user computing device to display the product identification message as a push notification on a user interface of the user computing device. The computing device may include less, additional, and/or alternative functionality, including that described herein.

In another aspect, a computing device for accelerated processing of new consumers of a product may be provided. The computing device may include at least one processor and/or associated transceiver in communication with a memory device. The at least one processor and/or associated transceiver may be programmed to: (i) store, in the memory device, geolocation data and telematics data associated with a plurality of existing consumers of the product within a geographic area, the geolocation data captured at a location sensor of a respective user computing device of each existing consumer, and the telematics data captured at a plurality of sensors of the respective user computing device of each existing consumer and representative of driving behavior of each existing consumer, (ii) store, in the memory device, a tiered ranking of the plurality of existing consumers, (iii) identify, from the stored geolocation data and telematics data associated with the plurality of existing consumers and the stored tiered ranking of the plurality of existing consumers, respective sets of shared parameters that are shared by existing consumers within each tier, (iv) receive a request from a subject user computing device of a subject user for the subject user to become a consumer of the product, wherein the request includes geolocation data and telematics data associated with the subject user, (v) determine, based upon the received geolocation data and telematics data from the subject user, whether the subject user shares any set of shared parameters with any tier of existing consumers, and/or (vi) based upon the determination, generate an offer for the subject user to become a consumer of the product. The computing device may include less, additional, and/or alternative functionality, including that described herein.

Advantages will become more apparent to those skilled in the art from the following description of the preferred embodiments which have been shown and described by way of illustration. As will be realized, the present embodiments may be capable of other and different embodiments, and their details are capable of modification in various respects. In addition, although certain steps of the exemplary processes are numbered, having such numbering does not indicate or imply that the steps necessarily have to be performed in the order listed. The steps may be performed in the order indicated or in another order. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
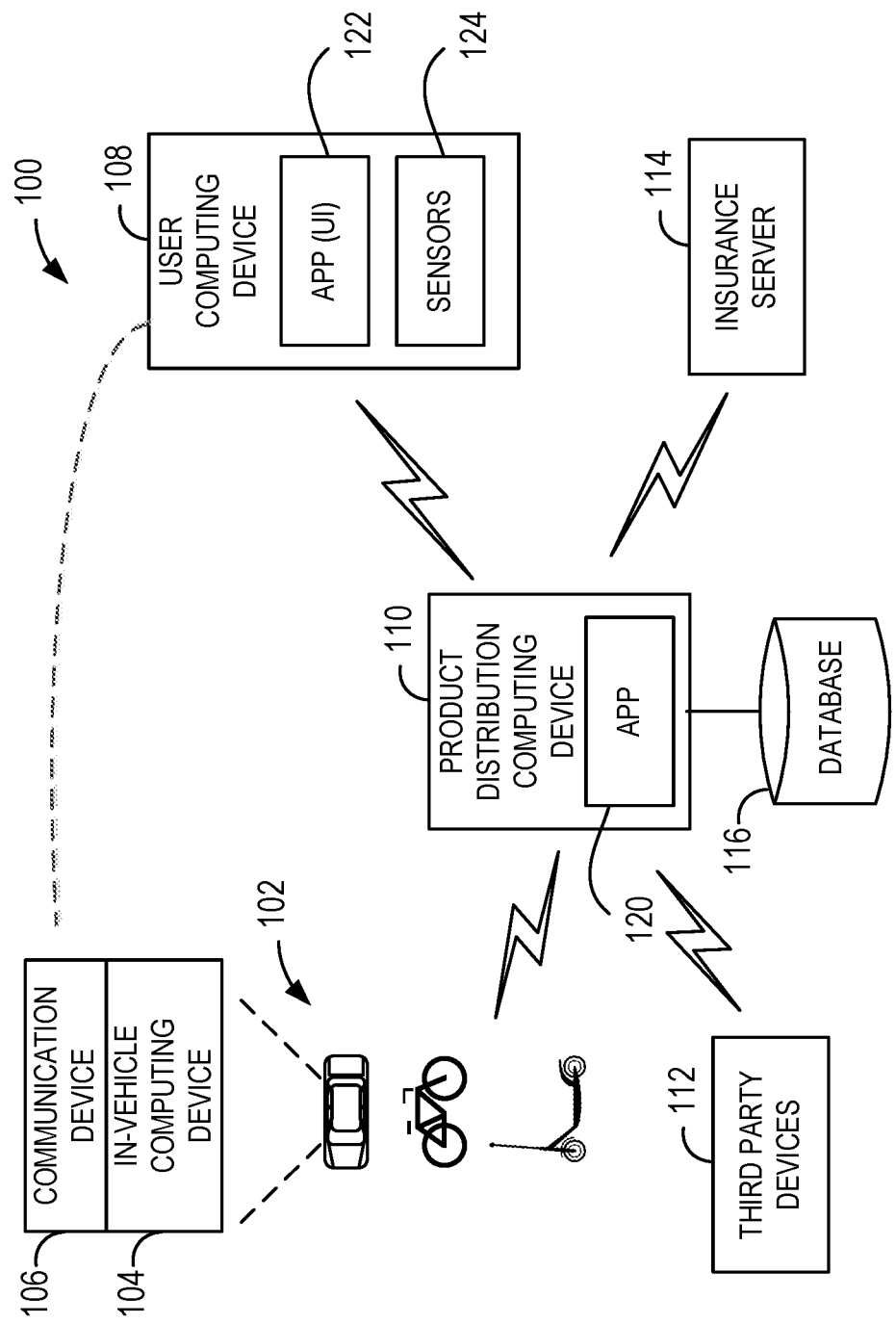
FIG. 1 illustrates a schematic diagram of an exemplary data analysis computer system including a product distribution computing device in accordance with the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for generating on-demand products based upon real-time geolocation, as well as other data (e.g., telematics data, historical geolocation data, environmental data, etc.). In particular, a computer system may include a product distribution computing device configured to receive, process, and synthesize real-time geolocation and/or telematics data from one or more user computing devices (e.g., a mobile telephone, a vehicle-based computing device, etc.) to offer relevant products to a consumer or user (e.g., an individual), including location-specific products.

As described further herein, products may refer to insurance products, such as insurance policies. In such embodiments, the products (e.g., location-specific or location-relevant insurance policies) may be selected, generated, and/or offered to a user in order to supplement or increase a user's insurance coverage. Therefore, a user may have a better or more comprehensive coverage when they are in certain locations or engaging in certain activities.

Using the user's real-time (and/or historical) geolocation and/or telematics data, the products offered to the user are more precise and relevant. Moreover, these products can be offered based upon minimal data (e.g., a user's opt-in and the user's location), which may accelerate and/or otherwise make an underwriting or policy-offer process more efficient. In addition, products that have been accepted or purchased by a user may be activated according to the methods described in the present disclosure. For example, an on-demand location-based insurance policy may be activated based upon a user's real-time geolocation data. Products may also include recommendations or alerts that are relevant to a user's location and/or behavior.

Also described herein are methods that leverage the telematics and/or location data of a plurality of users (e.g., existing consumers) to accelerate an underwriting process to offer products to other users (e.g., new consumers). It should be understood that in at least some embodiments, there may be manual actuarial and/or underwriting review and/or monitoring of models, policies, alerts, recommendations, and the like, that are generated based upon artificial intelligence, for consideration of both individual model factors and combinations of model factors.

In some embodiments, environmental data may be incorporated into various analyses to determine, for example, which products to offer a user, when to offer a product to a user, and the like. Environmental data is associated with an environment (e.g., a geographic area) in which geolocation and/or telematics data are captured, and may include, for example, weather data, traffic data, crime data, accident data, insurance claim data, demographic data, and the like.

"Vehicle," as used herein, may refer generally to any vehicle owned, operated, and/or used by one or more vehicle users. A vehicle may include any kind of vehicle, such as, for example, cars, trucks, all-terrain vehicles (ATVs), motorcycles, recreational vehicles (RVs), snowmobiles, boats, autonomous vehicles, semi-autonomous vehicles, user-driven or user-operated vehicles, industrial vehicles (e.g., construction vehicles), "riding" lawnmowers, farm equipment, planes, helicopters, flying cars, robo-taxis, self-driving taxis, and/or any kind of air-, water-, or land-based vehicle. A vehicle may additionally include personal mobility vehicles, such as bicycles, scooters, skateboards, and the like. Vehicles may also refer to vehicles used in any kind of transportation, including "personal" vehicles, public transportation, taxis, ride-sharing services, and the like.

"Autonomous vehicle," as used herein, may refer generally to any vehicle that has at least one automation system that is related to the piloting of the vehicle (e.g., warning systems assisting in a piloting task, intervention systems performing a piloting task, control systems performing a piloting task). The term "unautomated vehicle" refers to vehicles in which no automation systems are present (e.g., the vehicle is being piloted by the full-time performance of a human driver, and without enhancements from warning or intervention systems). The terms "semi-autonomous vehicle" and "autonomous vehicle" may be used interchangeably in some instances, and the term "autonomous vehicle" may be used to refer to both semi-autonomous vehicles and autonomous vehicles for purposes of convenience.

Automation systems include, for example, rear-view sensors and alarms (e.g., to detect obstacles while in reverse), anti-lock braking systems (e.g., to prevent wheel locking during deceleration), traction control systems (e.g., actuating brakes or reducing throttle to restore traction if wheels begin to spin), electronic stability control and acceleration slip regulation (e.g., to prevent the car from understeering or oversteering), dynamic steering response (e.g., to correct the rate of power steering based upon road conditions), cruise control (e.g., to maintain vehicle speed), autonomous cruise control (e.g., to adjust cruising speed to maintain safe distance from vehicles ahead), lane-keep assist systems (e.g., to alert the driver or adjust steering to keep the vehicle in its current lane), driver monitoring systems (e.g., to warn drivers when they become drowsy or fall asleep), adaptive headlamps (e.g., to alter the brightness or angle of headlamps), collision avoidance systems (e.g., to warn the driver an impending collision or adjust steering to avoid impending collision), parking assistance systems, blind spot monitoring systems, traffic sign recognition systems, dead man's switch systems, computer vision systems, location determination systems (e.g., GPS), and navigation systems (e.g., to navigate or assist in navigating the vehicle to a destination).

"App," as used herein, may refer generally to a software application installed and downloaded on a user computing device and executed to provide an interactive graphical user interface at the user computing device. An app associated with the computer system, as described herein, may be understood to be maintained by the computer system and/or one or more components thereof. Accordingly, a "maintaining party" of the app may be understood to be responsible for any functionality of the app and may be considered to instruct other parties/components to perform such functions via the app.

"Trip," as used herein, may refer generally to one complete use of a particular mode of transportation (e.g., type of travel) from a starting point to an ending point. Modes of transportation may include, but are not limited to, a personal vehicle, public transportation (e.g., buses, trolleys, trams, metro, subway, airlines, coaches, and rapid rail), taxis, ride-sharing services, scooters, bikes, etc.). In cases where a user is a vehicle driver, the trip may commence when the vehicle is started and may terminate when the vehicle is turned off. If a trip is defined in this way, the vehicle and/or the user's mobile computing device may automatically track and record trips, as commencement and termination are simply defined. In other cases where the user is a passenger of, for example, a public transportation service or a transportation network company (TNC) service, such as a ride-sharing or vehicle renting service, or where the user is riding a bike or scooter, the trip may be "manually" defined, such that the user designates a commencement and termination of a trip (e.g., when the user inputs and/or selects a destination using their mobile user computing device).

"Telematics data," as used herein, may refer generally to data associated with monitoring a moving computing device. Telematics data incorporates location, movement (e.g., speed, direction, acceleration, etc.), and condition (e.g., "on", "off", in-motion, etc.) data based upon a plurality of sensors on-board the computing device and/or connected to the computing device. Accordingly, where the computing device is associated with a vehicle, the telematics data may be associated with monitoring the vehicle. Where the computing device is a personal mobile computing device, such as a smart phone, the telematics data may be associated with monitoring the personal mobile computing device. In at least some cases, the personal mobile computing device may be used to capture vehicle telematics data, where the personal mobile computing device is present in/on a vehicle during motion/use of the vehicle.

"Sensor data," as used herein, may refer generally to data captured by sensors that is not necessarily associated with the movement of a computing device. For example, sensor data for a vehicle may include data that captures movement of occupants of the vehicle, which may not affect the motion of the vehicle. In some cases, telematics data may include sensor data, where data is sent in packets that include data from all sensors associated with a computing device (e.g., both motion and non-motion sensor data).

"Environmental data," as used herein, may refer generally to data not specific to the user but descriptive of the environment around and/or associated with the user at the time the geolocation and/or telematics data (and/or other sensor data) was captured. Environmental data may include ambient data (e.g., weather data, traffic data, market data, crime data), data associated with other computing devices or vehicles, policy data (e.g., posted speed limits, road closures, detours, etc.), cost data (e.g., gas prices, insurance policy premiums, maintenance costs, etc.), and the like. In some cases, environmental data is accessed from one or more third-party sources. Additionally or alternatively, environmental data is collected from sensors on one or more computing devices within the computer system described herein (e.g., user computing devices).

"Usage-based insurance" (UBI), as used herein, may refer generally to insurance policies based upon a user's particular usage or performance of one or more covered behaviors. For example, a usage-based policy associated with a user's travel may have certain charges or premiums associated with various types of travel (e.g., personal auto travel, public transportation, ride-sharing, biking, etc.). The cost of the policy may depend on how much the user uses each of those types of travel within a given time period (e.g., per month, per year, etc.).

"Personal mobility (PM) insurance" or "personal mobility policy (PMP)," as used herein, may refer generally to insurance policies based upon a user's usage of various forms of transportation. As increasingly more personal mobility options (e.g., modes of transportation) become available, users have more options to choose from when it comes to travel. Personal mobility insurance may provide coverage when a user is a pedestrian, a passenger of a ride-sharing service, and/or a driver of a rental vehicle, a semi-autonomous vehicle, and/or an autonomous vehicle. In other cases, personal mobility insurance may provide a user with coverage when the user rides a bike or an electric scooter.

Personal mobility insurance further provides coverage in cases where a user may not own a vehicle and/or not drive. For example, the user may travel from place to place by using various alternative forms of transportation, including walking, biking, using public transportation, and/or using ride-sharing services. In these cases, personal mobility insurance may offer coverage if the user is injured as (i) a ride-share service passenger due to the driver's negligence or fault, (ii) a pedestrian getting into or out of a ride-share vehicle, and/or (iii) a bike or electric scooter rider due to being injured by an uninsured motorist.

Additionally, the present embodiments may relate to micro-mobility or micro mobility trends. For instance, the PMP or other insurance policies may cover micro-mobility forms of transformation and/or provide micro-mobility coverage on demand. The present embodiments may provide micro-mobility coverage or micro-mobility insurance for short distance travel—such as the first mile of a trip (such as to reach or travel to a public transportation or a ride share pick-up point), or the last mile of the trip (such as to reach or travel to a final destination, such as via e-scooter or bike). In some embodiments, the micro-mobility coverage or insurance may be in the form of UBI. UBI micro-mobility coverage may be sold by time or mileages, or other units (e.g., rides, trips), for instance. In one embodiment, the micro-mobility coverage may cover modes of transportation and/or vehicles with speeds less than 20 mph, carry 1 or 2 people, and associated with trips of short distances (such as a 1 or 2 miles).

"On-demand insurance," as used herein, may refer generally to providing PMP (personal mobility policy) and/or micro-mobility UBI (usage-based insurance) quotes to a user in real time when coverage is requested by a user. On-demand insurance may provide coverage on a pay-as-you-go basis for each trip taken by the user (e.g., insurance provided on a trip-by-trip basis), as opposed to paying for coverage for a standard period of time (e.g., six months). For example, coverage may be requested or purchased for certain trips a user plans to take. PMP and/or micro-mobility insurance may be offered in various units, such as miles, time units, or rides. Micro-mobility insurance may cover short trips, such as the first mile and/or the last mile to a destination. For instance, the first mile and/or last mile to a destination may include users traveling by alternate forms of transportation, such as public transportation, ride shares, bicycles, or e-scooters.

Exemplary Embodiments

In the exemplary embodiment, a computer system is configured to leverage real-time geolocation and/or telematics data to generate on-demand products. In particular, a data analysis computer system may include a product distribution computing device configured to receive, process, and synthesize real-time geolocation and/or telematics data from one or more user computing devices (e.g., a mobile telephone, a vehicle-based computing device, etc.) to offer relevant products to a consumer or user (e.g., an individual), including location-specific products.

In some embodiments, the data analysis computer system may receive, retrieve, capture, and/or otherwise access geolocation data, telematics data, sensor data, contextual data, and/or additional or alternative data from a user's mobile device, one or more connected vehicles, and/or one or more third-party or external sources. The data analysis computer system may include any suitable data storage capabilities, such as cloud storage, to access and/or store any of the above data. In that way, the computer system may access and analyze current (e.g., real-time or near real-time) and/or historical data. In the exemplary embodiment, the computer system includes at least one product distribution computing device. The product distribution computing device is configured to perform the functions that may be more generally described herein as being performed by and/or attributed to the overall data analysis computer system.

In particular, in the exemplary embodiment, the product distribution computing device may be in communication with one or more computing devices associated with a user. These computing devices may include a personal mobile computing device, such as a smart phone, tablet, mobile device, wearable, smart glasses, smart watch, and the like. These computing devices may additionally or alternatively include a vehicle computing device associated with a vehicle, such as a personal vehicle of the user (e.g., a vehicle that the user drives or operates, which may be a non-autonomous, semi-autonomous, and/or autonomous vehicle) or another vehicle that the user utilizes for travel. A vehicle computing device may include a computing device integral to the vehicle and/or a personal mobile computing device that is in, on, or otherwise associated with the vehicle while the vehicle is operating.

The product distribution computing device may receive data from the computing device(s) (such as via wireless communication or data transmission over one or more radio frequency links), including real-time geolocation data representing a current real-time or near-real-time location of the user, telematics data associated with motion of the user (which may include speed, acceleration, braking, cornering, location, route, direction of travel, and other information), sensor data, contextual or environmental data, and/or any other type of data. The product distribution computing device may receive portions of such data from alternative computing devices, such as third-party computing devices. Additionally or alternatively, the product distribution computing device may access portions of such data from one or more databases or other memory devices.

The product distribution computing device may be configured to aggregate, combine, synthesize, parse, compare, and/or otherwise process this data, as described in more detail herein, in order to identify products that are available to a user based upon their geolocation.

In the exemplary embodiment, the product distribution computing device is also in data communication with a plurality of product sources (such as via wireless communication or data transmission over one or more radio frequency links), which include entities that have products available for consumption. Product sources may include insurance companies (e.g., offering insurance products), merchants (e.g., TNCs, personal mobility service providers, event hosts, etc.), and the like. Product sources may provide, to the product distribution computing device, product definitions associated with products available from and/or associated with the product source. Each product definition defines an availability of the respective product and includes a product availability location within which the product is available. The product definition may include additional parameters, such as a time over which the product is available, a time or location range over which a purchased or consumed product is active, eligibility requirements, and the like.

In some embodiments of the present disclosure, the product availability location may include and/or be based upon a geofence, which may be defined by the product source and/or by the product distribution computing device. The geofence may be a custom boundary.

Alternatively, the geofence may include one or more predefined geographic areas, such as one or more ZIP codes or ZIP+4 codes. Alternatively, the geofence may include a range around one or more geographic center points (e.g., a two-mile radius around a location A). An individual may be understood to be within a geofence when they are within the defined boundary of the geofence.

An individual may be understood to "enter" a geofence (or a "geofenced location") when they cross a boundary of the geofence, from outside the boundary to inside the boundary. Likewise, an individual may be understood to "leave" or "exit" a geofence when they cross a boundary of the geofence, from inside the boundary to outside the boundary.

Moreover, more than one geofence may be associated with a single product. For example, one geofence may define when the product distribution computing device may "push" a product to a user, and another geofence may define where the product is actually active. For instance, a product may be active in a Zone A, but the offer may be pushed once a user is within Zone B, which is a half-mile radius beyond Zone A.

In some embodiments of the present disclosure, a user may define their own geofence that defines a geographic area for which the user wishes to receive products, such as alerts or notifications (e.g., weather alerts, event notifications, etc.). In some instances, a user sets a geofence around their property or another area of interest, such as a vacation location (e.g., a lake). The user requests to receive alerts regarding that geofenced area, including weather alerts, when the user enters/exits the geofence, traffic data (e.g., for an area of higher traffic en route to a vacation home), and the like. In some cases, the user may also function as a "product source" of notification products pushed to their computing device, such as reminders (e.g., a notification upon leaving a work-location geofence to pick up groceries on the way home).

The product distribution computing device may store the product definitions and may compare a user's real-time geolocation to the stored product definitions to identify any product(s) that may be available to the user based upon their real-time geolocation. More specifically, the product distribution computing device may receive (such as via wireless communication or data transmission over one or more radio frequency links), from one or more user computing devices (e.g., a mobile computing device, a vehicle computing device, etc.) real-time geolocation data from at least one location sensor (e.g., a GPS sensor or system) of the user computing device over an interval of time. The real-time geolocation data may include a respective location of the user computing device throughout the interval of time. The product distribution computing device may then periodically query, over the interval of time, the memory device at which the product definitions are stored, using the real-time geolocation data.

Once the user enters a location associated with an available product (which may include entering or crossing a boundary of a geofence), the product becomes available to the user, and the query of the memory device returns the associated product definition. Specifically, when the user computing device enters a first location, based upon the real-time geolocation data, the product distribution computing device may detect that the user computing device has entered the first location by retrieving, in response to a successful query of the memory device, a first product definition associated with a first product of the at least one product, where the first product has a product availability location including the first location.

In response, the product distribution computing device may generate a product identification message including at least a portion of the first product definition, and transmit the product identification message to the associated user computing device (such as via wireless communication or data transmission over one or more radio frequency links). The product identification message may include instructions for the user computing device to display the product identification message as a push notification on a user interface of the user computing device. In other embodiments, the product identification message may include instructions for the user computing device to display the product identification message in an alternative format, such as an SMS/text message, an email message, a phone call, or any other message format. In at least some embodiments, the determination regarding whether to offer a product or transmit a message to a user may undergo manual review, for appropriate consideration of input factors and model outputs.

The product distribution computing device may store any received, retrieved, and/or accessed data in one or more databases, and may store any product identification messages, alerts, recommendations, user responses, tiered rankings of existing product consumers, geofences, and/or other generated data in the one or more databases. A database may be any suitable storage location, and may in some embodiments include a cloud storage device such that the database may be accessed by a plurality of computing devices (e.g., a plurality of product distribution computing devices, insurance computing devices, third-party computing devices, etc.). The database may be integral to the product distribution computing device or may be remotely located with respect thereto.

In one exemplary embodiment, a product may include an insurance product, such as insurance policies. In some such embodiments, the products (e.g., location-specific or location-relevant insurance policies) may be selected, generated, and/or offered to a user in order to supplement or increase a user's insurance coverage. Therefore, a user may have a better or more comprehensive coverage when they are in certain locations or engaging in certain activities.

Using the user's real-time (and/or historical) geolocation and/or telematics data, the products offered to the user are more precise and relevant. Moreover, these products can be offered based upon minimal data (e.g., a user's opt-in and the user's location), which may accelerate and/or otherwise make an underwriting or policy-offer process more efficient. Products may also include recommendations, notifications, or alerts that are relevant to a user's location and/or behavior. For example, user may be sent an alert when they enter and/or exit a geofence. In at least some embodiments, the determination regarding whether to send an alert, notification, or recommendation to a user may undergo manual review, for appropriate consideration of input factors and model outputs.

In some exemplary embodiments, the product may be specialized according to a particular location of interest that the user is near or a geofence that a user is entering (e.g., as determined based upon their real-time geolocation data). In one particular embodiment, high-risk locations and their associated geofences are pre-defined. High-risk locations may include locations associated with high-risk activities, such as mountain climbing, skydiving, extreme hiking, rafting, high-risk animal encounters, and the like.

When the product distribution computing device determines that the user has crossed a geofence boundary and is therefore at or approaching such a high-risk location, the product distribution computing device may identify a product associated with that location. For example, the product may include a supplemental insurance policy that is time-limited (e.g., lasts a day or a week, depending on the user's plans) but that offers additional coverage (e.g., a higher amount of coverage and/or additional coverage items, such as airlifting). The product may additionally or alternatively include an alert that the user has entered the high-risk location, and/or that the user's current insurance coverage may not be sufficient to cover associated high-risk activities. In at least some embodiments, the determination regarding whether to send an alert, notification, or recommendation to a user may undergo manual review, for appropriate consideration of input factors and model outputs.

In some embodiments, the product distribution computing device is communicatively coupled to one or more of the product sources via an API communication channel. As described above, the product source may be a TNC or a personal mobility service provider, and the product availability location may be a city in which the product source offers their services (e.g., ride-sharing services, rental scooters or bikes, etc.). The product definition may include the product availability location, as well as a product including an offer associated with the product source's service (e.g., a discount on rides, a number of free rides, etc.).

When a user enters a product availability location (e.g., as determined based upon their real-time geolocation data), the product distribution computing device may transmit a product identification message to their user computing device. The product identification message may include an identifier of the available product—in this embodiment, an offer from a TNC or personal mobility service provider. The available product may also include an insurance policy associated therewith, such as a PMP.

In some cases, the user may opt-in and define what types of products they are interested in, and therefore may accept offers associated with those products. For example, users may select whether they are interested in TNC products, other personal mobility products, on-demand insurance products, supplemental insurance products, and the like.

In some exemplary embodiments, a user or consumer can set or define their preferences regarding which kind of products to be offered and/or when existing products should be activated. For example, where a product is an insurance policy, the user can define which types of policies they are interested in (e.g., on-demand PMPs).

The user may also define whether such products should be automatically activated and/or conditions for doing so. For example, a user can define a preference for an insurance policy to increase coverage during weekends and/or when the user is in certain locations. As another example, the user can define a preference that a PMP is only active when the user is in a particular location.

In some embodiments, the product distribution computing device may request product definitions on-demand as well. For example, the product distribution computing device may notify a product source (e.g., via an API communication channel) that a user has entered a location associated with the product source. The product distribution computing device may request a product definition from the product source to offer to the user.

In one particular example, a user may be travelling to a new city. When the user enters the new city, the product distribution computing device may retrieve an existing product definition from the memory device, such as a personal mobility product offer (e.g., a discount on scooter rides in the city for a new customer) and a related PMP insurance product offer (e.g., a temporary policy that covers personal mobility product rides for the duration of the user's time in the new city). Alternatively, where no specific product is available, the product distribution computing device may notify the product source (e.g., the personal mobility service provider) of the user's entry into the city and may subsequently receive an appropriate product offer. The product distribution computing device may associate an insurance policy offer with the personal mobility product offer, and transmit the product identification message (including both offers) to the user's computing device.

In some embodiments, products may include notifications of nearby events. For example, a user enters, or is within, a geofence defined around the location of an event (e.g., a concert or a food festival), and the product identification message includes a notification to the user regarding the event. The product may further include an offer associated with the event (e.g., a discount on tickets or an offer for a free item if the user attends the event). In at least some embodiments, the determination regarding whether to send an alert, notification, or recommendation to a user may undergo manual review, for appropriate consideration of input factors and model outputs.

In some embodiments of the present disclosure, the services of the product distribution computing device are accessible to product sources via, for example, an SDK and/or API channel. A product source (e.g., a car dealership or personal mobility service provider) may feed data to the product distribution computing device and receive complementary products (e.g., available insurance policies associated with whatever product or service is offered by the product source). These complementary products may require certain data and be automatically activated upon that data being provided.

In one example, a personal mobility service provider offers a product including a scooter or bike rental ride. The personal mobility service provider collects data from a user (e.g., within an interface of a software application) and transmits that data to the product distribution computing device, such as via wireless communication or data transmission over one or more radio frequency links. Some required data may include user identification information and/or an opt-in to provide telematics and/or geolocation data during the scooter or bike rental ride. The product distribution computing device confirms that all required data has been provided, and transmits back to the personal mobility service provider an on-demand PMP that will cover the user for their scooter or bike rental ride.

As another example, a car dealer offers a product including a vehicle for sale. The car dealer collects data from a user (e.g., within an interface of a software application) and transmits that data to the product distribution computing device, again, such as via wireless communication or data transmission over one or more radio frequency links. Some required data may include user identification information and vehicle identification information. The product distribution computing device confirms that all required data has been provided, and transmits back to the car dealer vehicle insurance policy (or a quote therefor) for vehicle insurance for the user and the vehicle The product distribution computing device may be configured to determine how often to receive (or retrieve/request/access) the user's geolocation data, based upon, for example, telematics data received from the user computing device. In one exemplary embodiment, the real-time geolocation data is received from the user's computing device at a first frequency over the interval of time. The product distribution computing device may use the telematics data to determine a speed and heading of the user computing device over the interval of time, and, based upon the real-time geolocation data, speed, and heading, determine that future geolocation data should be received at a second frequency (e.g., less frequently or more frequently). Upon such a determination, the product distribution computing device may transmit instructions to the user computing device to transmit the real-time location data at the second frequency for a subsequent interval of time.

In some instances, a user may enter or approach a geofence that indicates the geolocation should be retrieved at a greater or reduced frequency. For example, a user may be leaving a city and driving through (or otherwise travelling through) a much less populated area. In such cases, the product distribution computing device may have been receiving geolocation data from the user computing device every minute or every five minutes, when the user was in the city. When the product distribution computing device determines (e.g., based upon the geolocation data, the speed, and the heading) the user has left the city, the product distribution computing device may determine that geolocation data is only needed (or requested/accessed) in ten- or fifteen-minute intervals, without losing accuracy. That is, the user is considered likely to remain in the less populated area for longer periods of time, and therefore geolocation data is needed less frequently to determine or estimate the user's location.

Conversely, when the product distribution computing device determines (e.g., based upon the geolocation data, the speed, and the heading) the user is nearing a city (or another location of interest, such as a highway junction) from a less-populated area, the product distribution computing device may determine that geolocation data is needed on a more frequent basis (e.g., every five minutes or every minute) to accurately monitor the user's location and/or behavior.

In some such embodiments, the product distribution computing device may receive or define geofences (or other boundaries) between areas that define how frequently to pull or receive location data. The product distribution computing device may implement artificial intelligence or machine learning techniques to determine or define these boundaries. For example, boundaries may be determined based upon points of interest, traffic data, accident data, crime data, population data, and the like.

Moreover, the product distribution computing device may implement machine learning and/or artificial intelligence techniques to determine the user's location based upon the geolocation data received at any frequency (including reduced frequency geolocation data). For example, based upon the geolocation data, the speed, and the heading, the product distribution computing device may determine the user's location with a particular confidence level. In a situation where a user is in a remote location, travelling at a particular speed on a highway in a first direction, the location of the user may be determined with a 95% confidence level even when only receiving the user's geolocation data every fifteen or twenty minutes.

It should be recognized that these techniques may be applied to the present disclosure to determine a user's location (and, therefore, determine when to push a product to the user) without requiring the constant receipt (or request) of the user's real-time geolocation data. Rather, the product distribution computing device may estimate the user's location based upon geolocation data received at any frequency, and the user's telematics data, with sufficient confidence to determine that a user has entered a certain location (e.g., crossed a geofence boundary) associated with a particular product (e.g., an on-demand or location-based insurance policy that should be pushed to the user and/or activated).

For instance, the product distribution computing device may determine the confidence level (or likelihood) that the user is in a location, is approaching or leaving a location, or has been in a location. In some embodiments, the product distribution computing device (or an insurance computing device in communication therewith) leverages these determinations to identify a risk level associated with a user's travels, which may increase an insurance premium or may cause an additional (e.g., on-demand) or supplemental insurance policy to be pushed to and/or activated for the user. Such techniques may also be applied to commercial users (e.g., drivers of commercial vehicles), where their location does not need to be monitored every minute, but some level of confidence that the user is on a correct route at the correct time may be needed. In at least some embodiments, determinations regarding policies or policy changes may undergo manual review or monitoring, for appropriate consideration of input factors and model outputs.

It should be recognized that accessing or receiving geolocation data at a reduced frequency may serve to increase the battery life of a user computing device, reduce the computational burden on the user computing device and the product distribution computing device, and reduce messaging between the user computing device and the product distribution computing device, without compromising the accuracy of location determination (and/or other processes based thereon, such as determining when to push a product offer or activate an insurance policy).

The product distribution computing device may also be configured to factor additional variables into the determination of when to push an offer for a product to a user (and/or activate a product). The product distribution computing device may implement machine-learning and/or artificial intelligence techniques to learn what products a user currently has and/or how they use those products (e.g., how/where a user has insurance coverage), as well as products the user may lack (e.g., coverage in certain areas the user travels to and/or certain activities the user undertakes). The product distribution computing device may leverage the user's (real-time and/or historical) geolocation and/or telematics data, user data defining which product(s) a user already has or accesses, and/or environmental data (e.g., traffic data, weather data, crime data, insurance claim data, etc.) in these analyses to determine whether a user has sufficient coverage or should have a product (e.g., an on-demand policy, a PMP, an increase in liability coverage) should be pushed to the user.

In one example, the product distribution computing device may determine that a user occasionally (or frequently) visits a certain location that, based upon environmental data, requires more liability coverage than the user currently has. In such cases, the product distribution computing device may push a supplemental policy or an increase in their current insurance policy to the user. As another example, the product distribution computing device may determine that the user is accessing personal mobility vehicles, such as scooters, but their automobile insurance policy would not cover these activities. In such cases, the product distribution computing device may push a PMP to the user to cover these activities.

The products pushed to the user by the product distribution computing device may be time-limited or activity-limited, based upon the user's actual activities or plans. For example, the PMP may only be active when the user is in the city in which they use the personal mobility vehicles, or only on weekends when the user is actually using the personal mobility vehicles. As another example, where a user is renting a vehicle (e.g., a rental car), the user's automobile policy may not cover the vehicle and/or usage thereof. The product distribution computing device may offer to the user a supplemental policy product that would cover the user for the length of the rental period.

These techniques may improve overall coverage and reduce risks, and may enable users to update or modify their policies in real-time based upon their actual needs and behaviors.

In some embodiments of the present disclosure, the product distribution computing device may be configured to leverage geolocation and/or telematics data for existing consumers of a product to determine whether the product should be offered to a potential new consumer and, if so, with what parameters (e.g., cost, coverage level, etc.). In these embodiments, the product distribution computing device may receive, access, and/or process historical geolocation and/or telematics data for a plurality of existing consumers. The product distribution computing device may store, in a memory device, the geolocation data and telematics data associated with the plurality of existing consumers of the product within a particular geographic area. As described herein, the geolocation data is captured at a location sensor of a respective user computing device of each existing consumer, and the telematics data is captured at a plurality of sensors (e.g., accelerometers, GPS sensors, directional sensors, etc.) of the respective user computing device of each existing consumer and is representative of, in the exemplary embodiment, the driving behavior of each existing consumer.

The product distribution computing device may further store a tiered ranking of the plurality of existing consumers. More specifically, each existing consumer may be ranked in one tier of a plurality of tiers, based at least in part upon their telematics data (e.g., their driving behavior), and, in some embodiments, environmental data (e.g., crime data, accident data, insurance claim data, etc.). The tiers may include a top or preferred tier, indicating consumers in this tier have above-standard driving behavior; a middle or standard tier, where consumers in this tier have average or standard driving behavior; and a low or below-standard tier, where consumers in this tier have below-average or below-standard driving behavior (e.g., riskier driving behavior). It should be readily understood that there may be greater than three tiers or fewer than three tiers. Each tier may have different parameters of products associated therewith. For example, insurance products offered to consumers in different tiers may have different prices (e.g., premium or deductible costs), coverage levels, and the like.

In some embodiments, the product distribution computing device receives and stores the tiered rankings from an external source (e.g., an insurance computing device). Alternatively, the product distribution computing device determines the tiered rankings, for example, by applying artificial intelligence and/or machine learning techniques to the telematics data thereof (and/or to the environmental data for the geographic area). It should be readily understood that considerations surrounding the definition and use of these tiers for making recommendations, offering policies, and the like, may undergo manual review or monitoring, for appropriate review of input factors and model (e.g., machine learning or artificial intelligence) outputs.

Moreover, the product distribution computing device may be configured to apply various processing techniques (e.g., machine learning and/or artificial intelligence techniques) to identify one or more shared parameters that are shared by existing consumers within each tier. The parameters may not be shared by every consumer within the tier but may be shared by a majority, significant portion, plurality, etc. of the consumers within the tier. The parameters may represent particular behaviors (e.g., slow acceleration, safer cornering, travel during particular times/days, travel in particular locations or travel that avoids particular locations, etc.) or characteristics (e.g., demographic characteristics, vehicle ownership or usage characteristics, etc.). Each tier may have any number of shared parameters.

A new or potential consumer (a "subject user") of the product (e.g., an insurance policy, in particular an on-demand and/or short-term insurance policy product) may transmit a request to the product distribution computing device, requesting to become a consumer of the product. The request may include geolocation and/or telematics data associated with the subject user. The geolocation and/or telematics data may be captured by one or more sensors of the subject user's computing device over a period of time preceding the request. Alternatively, the request may include permission for the product distribution computing device to access, receive, or retrieve geolocation data and/or telematics data for any interval of time (preceding and/or after the request).

The product distribution computing device may then determine, based upon the received (or retrieved/accessed) geolocation data and telematics data from the subject user, whether the subject user shares any set of shared parameters with any tier of existing consumers. The subject user may not need to share all shared parameters in a set of shared parameters for a tier, but may share a plurality or majority of shared parameters. For example, where a tier shares 4 parameters (e.g., they travel to location A, do not travel to location B, travel within the speed limit a threshold percentage of time, and do not travel between 1 AM and 6 AM), the subject user may share 2 or 3 parameters. The subject user may have to share a threshold number of parameters, a threshold percentage of parameters, and/or certain types of parameters in order to be considered to share the set of shared parameters with the tier. Alternatively, the subject user may be considered to share the set of shared parameters with whichever tier the subject shares the most parameters with (e.g., is the most similar to).

Based upon these determinations, the product distribution computing device "ranks" or "groups" the subject user with one of the tiers, and further determines whether to offer the product to the subject user and, if so, with which product characteristics. In the exemplary embodiment, the product distribution computing device offers the product to the subject user with product characteristics common to the existing consumers in the same tier (e.g., with an average, median, or standard cost or coverage level). If the subject user is ranked or group into a lower tier (e.g., a tier below some threshold), the product distribution computing device may not offer the product to the subject user.

This process may be referred to as "accelerated underwriting" and may be particularly useful for short-term and/or on-demand insurance policies, in which traditional underwriting procedures cannot be performed (e.g., due to time and/or cost constraints). According the present disclosure, a subject user can be offered an insurance product based upon their core similarities with existing consumers. It should be understood that in at least some embodiments, there may be manual actuarial and/or underwriting review and/or monitoring of models and policies generated based upon artificial intelligence, for consideration of both individual model factors and combinations of model factors.

Additionally or alternatively, these processes may be leveraged to generate rankings of a subject user that are transmitted to external sources (e.g., recommendations to TNCs as to whether the subject user may be a good driver). These processes may leverage additional or alternative data, such as data associated with TNC/personal mobility service provider software applications (e.g., UBER/LYFT ratings).

The product distribution computing device may leverage a user's (real-time and/or historical) geolocation and/or telematics data to identify common or repeated locations and/or common or repeated routes for the user. As used herein, a repeated route may include a route the user travels more than a threshold number of times within a certain duration (e.g., within a week, month, or year) and/or a route the user travels with a defined periodicity (e.g., every weekday morning, every Tuesday evening, etc.). The product distribution computing device may identify repeated routes using geolocation and/or telematics data from the user's mobile device and/or connected vehicle. Likewise, repeated locations may include a location at which the user is present more than a threshold number of times within a certain duration and/or a location at which the user is present with a defined frequency or periodicity.

The product distribution computing device may perform the same processes for a plurality of users, and identify users that share the same repeated location. The product distribution computing device may transmit a carpool offer identification message to any of these users, including an identification of the other user(s) with the same repeated location (s), the shared repeated location(s), and a recommendation for the user(s) to carpool. In some embodiments, the product distribution computing device may transmit consent request messages to each user prior to sending any carpool offer identification messages, the consent request messages requesting consent from each user to share user information with other users.

Moreover, the product distribution computing device may transmit additional messages to and/or receive additional messages from the users. For example, the product distribution computing device may determine, from the users, which user is a driver and which user(s) is a rider in the driver's vehicle for the carpool, by requesting users to agree to be a driver. It should be recognized that different users may agree to be a driver for different trips and/or for different days. In some embodiments, the product distribution computing device may recommend that one user agree to be the driver, because the costs associated therewith are lower (e.g., a fuel cost, maintenance cost, and/or insurance cost are lower for that driver and/or their vehicle) or because that user can accommodate more people in their vehicle.

In some embodiments, where the carpool offer is agreed to by multiple users, the product distribution computing device may transmit a notification to an insurance computing device (such as via wireless communication or data transmission over one or more radio frequency links), identifying the users and the carpool (and, in some cases, the driver(s) and/or their vehicles). In response, the insurance computing device may issue discount(s) or other rewards (e.g., credits, gift cards, charity contributions, etc.) to one or more of the user(s) and/or adjust an insurance policy cost (e.g., a premium cost) for one or more of the user(s). In certain embodiments, the product distribution computing device may request this information from the insurance computing device prior to pushing the carpool offer to the users. That is, the product distribution computing device may present the potential discounts, rewards, or other benefits to the user to encourage the users to carpool, prior to the users accepting the carpool offer. In certain embodiments, the determination to transmit messages related to carpooling may be reviewed or monitored by a human analyst, for appropriate consideration of input factors and model outputs.

It is contemplated that any of the techniques or processes may be implemented in an urban or high population-density environment, as part of an ecosystem generally oriented towards improving quality of life in these environments. As part of this ecosystem, "mobility hubs" may be created (e.g., as part of a public-private partnership) that combines data analytics services and multi-modal transportation opportunities with insurance, financial, mobility, and/or lifestyle advice for users in different stages of life and/or experiencing different life choices. These hubs may be staffed by various advisors that can advise users on various aspects of life in a city, such as experts in different fields (e.g., automobile and/or personal mobility policies, home and/or renter's insurance policies, life insurance, financial services, etc.) with a focus on navigating insurance, financial and mobility needs in the particular urban environments.

For example, advisers at a mobility hub may provide information to help an individual answer questions associated with their particular life choices, such as "Should I buy or rent? Where? What does that mean for my transit/mobility options? How does that affect my financial well-being? Given my choices, what insurance needs do I have? Does the whole picture make sense given my income, job location, and lifestyle (e.g., single, coupled, several children at home, etc.)?"

The mobility hub may also include representatives for various modes of transportation and/or may function as a hub for such transportations modes. For example, the mobility hub may be co-located with a train or bus station, may provide car rental services, and may be a hub for personal mobility vehicles (e.g., scooters, bikes, etc.) and/or ride-sharing services, and the like.

The mobility hub may additionally or alternatively provide feedback to stakeholders (e.g., city, state, and university leadership, public and private transportation providers) concerning multimodal transit needs and infrastructure, based upon interaction with constituent users.

The methods and system described herein may be implemented using computer programming or engineering techniques including computer software, firmware, hardware, or any combination or subset. As disclosed above, at least one technical problem with current systems includes the inability to reconcile data from disparate sources, including geolocation data, telematics data (such as location, speed, acceleration, braking, cornering, GPS, and other vehicle or home telematics information), sensor data, and environmental data, without time-consuming and error-prone human intervention. As such, current systems may be limited in how they can use data to generate profiles of user behavior.

The technical effect of the systems and processes described herein may be achieved by performing at least one of the following actions: (a) receiving, from at least one product source, at least one product definition associated with a respective at least one product, wherein each at least one product definition defines an availability of the respective product and includes a product availability location within which the product is available; (b) storing the at least one product definition in the memory device; (c) receiving, from a user computing device, real-time location data from at least one location sensor of the user computing device over an interval of time, the real-time location data including a respective location of the user computing device throughout the interval of time; (d) periodically querying, over the interval of time, the memory device with the real-time location data; (e) when the user computing device enters a first location, based upon the real-time location data, detecting that the user computing device has entered the first location by retrieving, in response to a successful query of the memory device, a first product definition associated with a first product of the at least one product, wherein the first product has a product availability location including the first location; (f) generating a product identification message including at least a portion of the first product definition; (g) transmitting the product identification message to the user computing device, the product identification message including instructions for the user computing device to display the product identification message as a push notification on a user interface of the user computing device; (h) storing, in the memory device, geolocation data and telematics data associated with a plurality of existing consumers of the product within a geographic area, the geolocation data captured at a location sensor of a respective user computing device of each existing consumer, and the telematics data captured at a plurality of sensors of the respective user computing device of each existing consumer and representative of driving behavior of each existing consumer; (i) storing, in the memory device, a tiered ranking of the plurality of existing consumers; (j) identifying, from the stored geolocation data and telematics data associated with the plurality of existing consumers and the stored tiered ranking of the plurality of existing consumers, respective sets of shared parameters that are shared by existing consumers within each tier; (k) receiving a request from a subject user computing device of a subject user for the subject user to become a consumer of the product, wherein the request includes geolocation data and telematics data associated with the subject user; (l) determining, based upon the received geolocation data and telematics data from the subject user, whether the subject user shares any set of shared parameters with any tier of existing consumers; and/or (m) based upon the determination, generating an offer for the subject user to become a consumer of the product.

The resulting technical effects may include, for example: (i) increasing and/or optimizing user insurance coverage based upon their actual location and/or behavior; (ii) developing new and increasing sources of non-driving telematics data by encouraging alternative travel modes; (iii) enabling real-time provision of insurance products based upon actual user location and/or behavior; and/or (iv) accelerating and/or eliminating aspects of conventional underwriting processes.

Exemplary Computer System for Generating on-Demand Products Based Upon Real-Time Geolocation Data FIG. 1 depicts a schematic diagram of an exemplary data analysis computer system 100. Data analysis computer system 100 may be configured to generate on-demand products based upon real-time geolocation data and/or perform accelerated processing of new consumers of a product. In one exemplary embodiment, data analysis computer system 100 may include and/or facilitate communication between one or more vehicles 102 (e.g., via an in-vehicle computing devices 104 and/or communication devices 106), one or more user computing devices 108 (which may also be referred to as "mobile devices"), and a product distribution computing device 110, and/or between product distribution computing device 110 and one or more of third party devices 112 and/or insurance servers 114.

Product distribution computing device 110 may be implemented as a server computing device with artificial intelligence and deep learning functionality. Alternatively, product distribution computing device 110 may be implemented as any device capable of interconnecting to the Internet, including mobile computing device or "mobile device," such as a smartphone, a "phablet," smart glasses, smart watch, wearable, or other web-connectable equipment or mobile devices. Product distribution computing device 110 may be in communication with vehicles 102, one or more user computing devices 108, third party devices 112, and/or insurance servers 114, such as via wireless communication or data transmission over one or more radio frequency links or wireless communication channels. In the exemplary embodiment, components of data analysis computer system 100 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular telecommunications connection (e.g., a 3G, 4G, 5G, etc., connection), a cable modem, and a BLUETOOTH connection.

Data analysis computer system 100 also includes one or more database(s) 116 containing information on a variety of matters. For example, database 116 may include such information as geolocation data, telematics data, other sensor data, environmental data, product definitions, geofences, consumer tiered rankings, generated offers, alert, recommendations, and/or any other information used, received, and/or generated by data analysis computer system 100 and/or any component thereof, including such information as described herein. In one exemplary embodiment, database 116 may include a cloud storage device, such that information stored thereon may be securely stored but still accessed by one or more components of data analysis computer system 100, such as, for example product distribution computing device 110, in-vehicle computing devices 104, user computing devices 108, and/or insurance servers 114. In one embodiment, database 116 may be stored on product distribution computing device 110. In any alternative embodiment, database 116 may be stored remotely from product distribution computing device 110 and may be non-centralized.

Data analysis computer system 100 includes a plurality of vehicles 102 registered therewith. In the exemplary embodiment, each vehicle 102 includes a communication device 106 such that the vehicle 102 may communicate with product distribution computing device 110, for example, via the Internet, to receive instructions and/or transmit geolocation data, telematics data, and/or other information. Vehicle 102 may additionally communicate with other components of data analysis computer system 100, such as database 116, user computing device(s) 108, insurance server 114, etc. Vehicles 102 may be configured to capture and/or generate geolocation and/or telematics data during operation thereof (whether the vehicles are autonomous, semi-autonomous, and/or manually driven). Specifically, vehicles 102 have one or more sensors disposed thereon, such as location sensors, audio sensors, video sensors, cameras, LIDAR, RADAR, GPS/navigation systems, acceleration/deceleration sensors, braking sensors, turning sensors, scanners, and/or any other sensor, including those described elsewhere herein.

The sensors operate and collect and/or generate geolocation and/or telematics data passively and/or actively as the vehicle 102 operates. The sensors may detect, for example, conditions of vehicle 102, such as speed, acceleration, braking, cornering, direction, heading, route, destination, gear, braking, and other conditions related to the operation of vehicle 102, for example: at least one of a measurement of at least one of speed, direction, rate of acceleration, rate of deceleration, location, position, orientation, and rotation of the vehicle, and a measurement of one or more changes to at least one of speed, direction, rate of acceleration, rate of deceleration, location, position, orientation, and rotation of the vehicle. In some embodiments, the sensor data includes information captured about the environment and/or other objects around the vehicle (e.g., infrastructure, weather, other vehicles, people, etc.). Product distribution computing device 110 may receive any such data from vehicles 102 (e.g., via in-vehicle computing device 104 and communication device 106).

In the exemplary embodiment, user computing devices 108 may be computers that include a web browser or a software application to enable user computing devices 108 to access the functionality of product distribution computing device 110 using the Internet or a direct connection, such as a cellular network connection. User computing devices 108 may be any device capable of accessing the Internet including, but not limited to, a desktop computer, a mobile device (e.g., a laptop computer, a personal digital assistant (PDA), a cellular phone, a smartphone, a tablet, a phablet, netbook, notebook, smart watches or bracelets, smart glasses, wearable electronics, pagers, etc.), or other web-based connectable equipment.

Each user computing device 108 may be associated with a particular user, which may include an insured associated with an insurance policy offered by insurance server 114. User computing devices 108 may be used to access a data management app (e.g., a telematics collection app, insurance app, and/or game app) 120 maintained by product distribution computing device 110, for example, via a user interface 122 when data management app 120 is executed on user computing device 108. A user may use data management app 120 to provide inputs to product distribution computing device 110, change preferences (e.g., provide permission for product distribution computing device 110 to receive geo-location and/or telematics data), receive product identification messages, view insurance policy information, and perform other actions, including those described elsewhere herein.

User computing devices 108 may be configured to capture and/or generate geolocation and/or telematics data during operation thereof (e.g., while the user computing device 108 is on or active and/or in motion). Specifically, user computing devices 108 have one or more sensors 124 disposed thereon, such as location sensors, audio sensors, video sensors, cameras, GPS/navigation systems, accelerometers, gyroscopes, scanners, and/or any other sensor, including those described elsewhere herein. Sensors 124 operate and collect and/or generate geolocation and/or telematics data passively and/or actively as user computing device 108 is operating. In some embodiments, the data includes information captured about the respective device's motion, the environment around the device (e.g., temperature, sounds, etc.), and objects around the device. Product distribution computing device 110 may receive any such data from user computing devices 108.

Product distribution computing device 110 may be configured to process geolocation and/or telematics data received from vehicles 102 and/or user computing devices 108, and/or data received from third-party devices 112, to identify products available to a user and offer those products to the user (and/or activate existing products). Product distribution computing device 110 may be further configured to leverage environmental data (which may be received from any of the above-described devices and/or accessed from database 116) to enrich the determinations regarding which products to offer a user and/or when to do so. Product distribution computing device 110 may then generate user-specific and location-specific user offerings, such as insurance policies, alerts, recommendations, and the like.

Third party devices 112 may be computing devices associated with external sources of data, such as sources of environmental data. Product distribution computing device 110 may request, receive, and/or otherwise access data from third party devices 112. Third party devices 112 may be any devices capable of interconnecting to the Internet, including a server computing device, a mobile computing device or "mobile device," such as a smartphone, or other web-connectable equipment or mobile devices.

Insurance server 114 may be associated with and/or maintained by an insurance provider, which provides insurance policies associated with vehicles 102, vehicle users, and the like. Insurance server 114 may communicate with product distribution computing device 110, vehicles 102, user computing device(s) 108, and/or database 116 in order to transmit and/or receive information associated with the insurance policies. For example, insurance server 114 may transmit product definitions associated with insurance policies to product distribution computing device 110.

Figure 2:
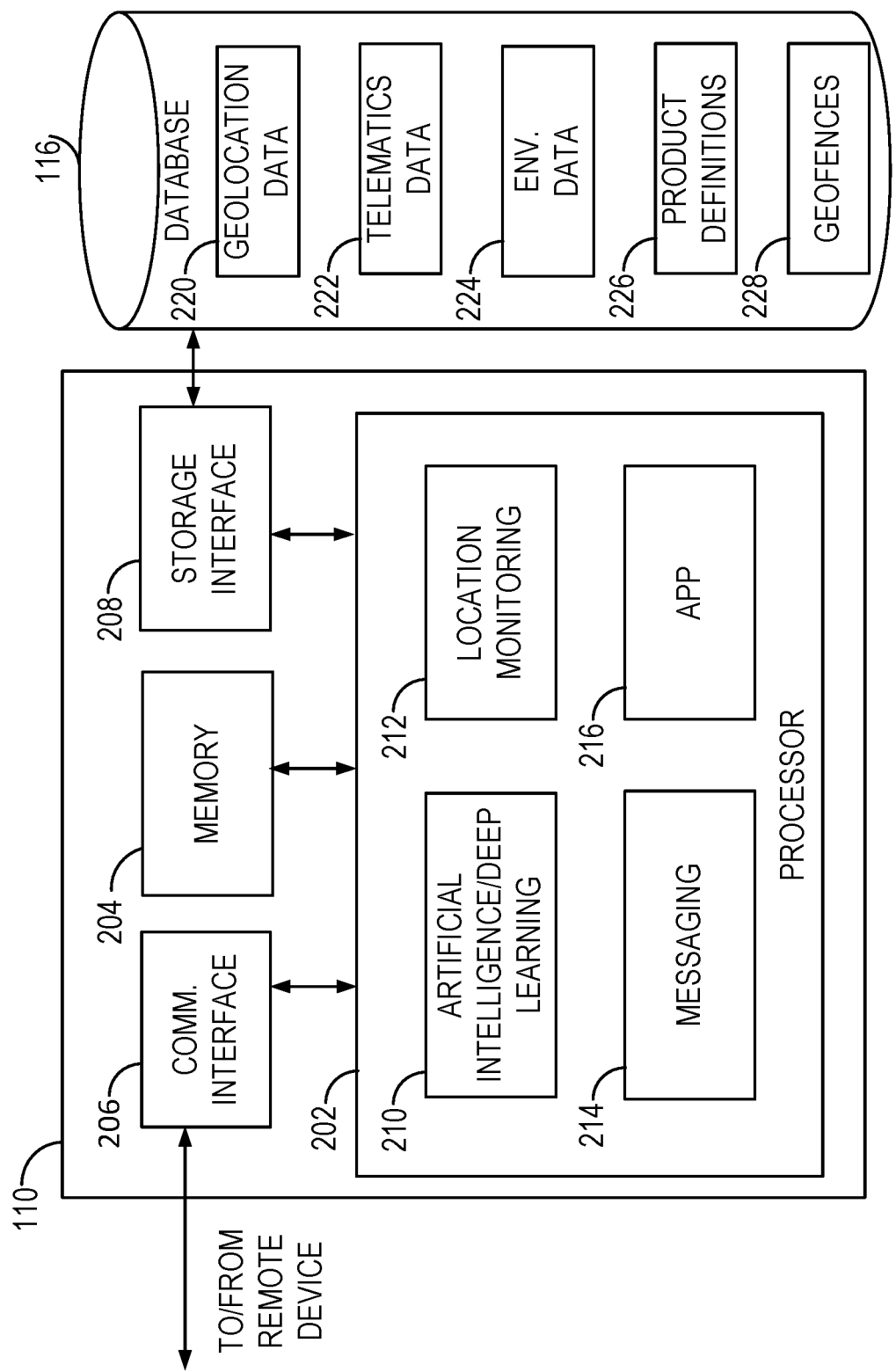
FIG. 2 illustrates a schematic diagram of an exemplary product distribution computing device that may be used in the data analysis computer system shown in FIG. 1.

In the exemplary embodiment, third party devices 112 and/or insurance server 114 may be a source of product definitions, as described herein, and may be referred to as "product sources." EXEMPLARY PRODUCT DISTRIBUTION COMPUTING DEVICE FIG. 2 depicts an exemplary product distribution computing device 110 (as shown in FIG. 1). In one exemplary embodiment, product distribution computing device 110 may include a processor 202, a memory 204 (which may be similar to database 116, also shown in FIG. 1), a communication interface 206, and a storage interface 208. Processor 202 is configured to execute instructions, which may be stored in memory 204. Processor 202 includes one or more processing units (e.g., in a multi-core configuration) and may be configured to execute a plurality of modules.

In the exemplary embodiment, processor 202 is operable to execute an artificial intelligence/deep learning (AI/DL) module 210, a location monitoring module 212, a messaging module 214, and a module 216 that maintains functionality for data management app 120 (shown in FIG. 1). Modules 210, 212, 214, and 216 may include specialized instruction sets, and/or coprocessors. Database 116 and/or memory 204 may store any data and/or instructions necessary for modules 210, 212, 214, and 216 to function as described herein. In the exemplary embodiment, database 116 may store geolocation data 220, telematics data 222, environmental data 224, product definitions 226, and/or geofences 228.

AI/DL module 210 may execute artificial intelligence and/or deep learning functionality on behalf of any other module. Specifically, AI/DL module 210 may include any rules, algorithms, training data sets/programs, and/or any other suitable data and/or executable instructions that enable product distribution computing device 110 employ artificial intelligence and/or deep (machine) learning as described herein. Location monitoring module 212 may receive and process geolocation data and any other received and/or stored data to determine products to offer to the user and/or to activate, based at least in part upon the user's location. Messaging module 214 may generate and transmit messages (e.g., product identification messages, notifications, alerts, offers, recommendations, etc.) to user computing device 108 and receive messages therefrom. Messaging module 214 may also transmit messages to and/or receive messages therefrom other devices, such as third-party devices 112, insurance server 114, and the like.

Location monitoring module 212 may receive data from user computing device(s) 108 and/or vehicles 102 (e.g., via in-vehicle computing devices 104 and/or communication devices 106), including real-time geolocation data representing a current real-time or near-real-time location of an associated user, telematics data associated with motion of the user, sensor data, contextual or environmental data, and/or any other type of data. Location monitoring module 212 (and/or AI/DL module 210) may be configured to aggregate, combine, synthesize, parse, compare, and/or otherwise process this data, as described in more detail herein, in order to identify products that are available to a user based upon their location.

Location monitoring module 212 may receive product definitions 226 associated with products available from and/or associated with a respective product source. Each product definition 226 defines an availability of the respective product and includes a product availability location within which the product is available. Product definitions 226 may include additional parameters, such as a time over which the product is available, a time or location range over which a purchased or consumed product is active, eligibility requirements, and the like.

Location monitoring module 212 may store received product definitions 226 and may compare a user's real-time geolocation to the stored product definitions 226 to identify any product(s) that may be available to the user based upon their real-time geolocation. More specifically, location monitoring module 212 may receive, from one or more user computing devices 108 real-time geolocation data from at least one location sensor 124 (e.g., a GPS sensor or system) of user computing device 108 over an interval of time. The real-time geolocation data includes a respective location of user computing device 108 throughout the interval of time.

Location monitoring module 212 may then periodically query, over the interval of time, database 116, using the real-time geolocation data. Once the user enters a location associated with an available product (which may include entering or crossing a boundary of a geofence 228), the product becomes available to the user, and the query of database 116 returns the associated product definition 226. Specifically, when user computing device 108 enters a first location, based upon the real-time geolocation data, location monitoring module 212 may detect that user computing device 108 has entered the first location by retrieving, in response to a successful query of database 116, a first product definition 226 associated with a first product of the at least one product, where the first product has a product availability location including the first location.

In response, messaging module 214 may generate a product identification message including at least a portion of the first product definition 226, and transmit the product identification message to the associated user computing device 108. The product identification message includes instructions for user computing device 108 to display the product identification message as a push notification on a user interface of user computing device 108. In other embodiments, the product identification message may include instructions for user computing device 108 to display the product identification message in an alternative format, such as an SMS/text message, an email message, a phone call, or any other message format.

In one exemplary embodiment, a product may include an insurance product, such as insurance policies. In some such embodiments, the products (e.g., location-specific or location-relevant insurance policies) may be selected, generated, and/or offered to a user in order to supplement or increase a user's insurance coverage. Therefore, a user may have a better or more comprehensive coverage when they are in certain locations or engaging in certain activities. Using the user's real-time (and/or historical) geolocation and/or telematics data, the products offered to the user are more precise and relevant.

Moreover, these products can be offered based upon minimal data (e.g., a user's opt-in and the user's location), which may accelerate and/or otherwise make an underwriting or policy-offer process more efficient. Products may also include recommendations, notifications, or alerts that are relevant to a user's location and/or behavior. For example, messaging module 214 may transmit an alert to user computing device 108 when that device is determined to have entered and/or exited a geofence 228.

In some exemplary embodiments, the product may be specialized according to a particular location of interest that the user is near or a geofence 228 that a user is entering (e.g., as determined based upon their real-time geolocation data). In one particular embodiment, high-risk locations and their associated geofences are pre-defined. High-risk locations may include locations associated with high-risk activities, such as mountain climbing or extreme hiking, rafting, high-risk animal encounters, and the like.

When location monitoring module 212 determines that the user has crossed a geofence boundary and is therefore at or approaching such a high-risk location, location monitoring module 212 may identify a product associated with that location. For example, the product may include a supplemental insurance policy that is time-limited (e.g., lasts a day or a week, depending on the user's plans) but that offers additional coverage (e.g., a higher amount of coverage and/or additional coverage items, such as airlifting). The product may additionally or alternatively include an alert that the user has entered the high-risk location, and/or that the user's current insurance coverage may not be sufficient to cover associated high-risk activities. Messaging module 214 may transmit an offer for the product to user computing device 108.

In some embodiments, product distribution computing device 110 is communicatively coupled to one or more of the product sources via an API communication channel. As described above, the product source may be a TNC or a personal mobility service provider, and the product availability location may be a city in which the product source offers their services (e.g., ride-sharing services, rental scooters or bikes, etc.). A product definition 226 may include the product availability location as well as a product including an offer associated with the product source's service (e.g., a discount on rides, a number of free rides, etc.). When a user enters a product availability location (e.g., as determined based upon their real-time geolocation data), messaging module 214 transmits a product identification message to user computing device 108. The product identification message includes an identifier of the available product—in this embodiment, an offer from a TNC or personal mobility service provider. The available product may also include an insurance policy associated therewith, such as a PMP.

In some embodiments, product distribution computing device 110 may request product definitions 226 on-demand. For example, messaging module 214 may notify a product source (e.g., via an API communication channel) that a user has entered a location associated with the product source. Messaging module 214 may request a product definition 226 from the product source to offer to the user.

In one particular example, a user is travelling to a new city. When they enter the new city, location monitoring module 212 may retrieve an existing product definition 226 from database 116, such as a personal mobility product offer (e.g., a discount on scooter rides in the city for a new customer) and a related PMP insurance product offer (e.g., a temporary policy that covers personal mobility product rides for the duration of the user's time in the new city). Alternatively, where no specific product is available, messaging module 214 may notify the product source (e.g., the personal mobility service provider) of the user's entry into the city and may subsequently receive an appropriate product offer. Location monitoring module 212 and/or messaging module 214 may associate an insurance policy offer with the personal mobility product offer, and messaging module 214 may transmit the product identification message (including both offers) to the user's computing device 108.

In some embodiments, products may include notifications of nearby events. For example, a user enters or is within a geofence defined around the location of an event (e.g., a concert or a food festival), and the product identification message includes a notification to the user regarding the event. The product may further include an offer associated with the event (e.g., a discount on tickets or an offer for a free item if the user attends the event).

In some embodiments of the present disclosure, the services of product distribution computing device 110 may be accessible to product sources via, for example, an SDK and/or API channel. A product source (e.g., a car dealership or personal mobility service provider) may feed data to product distribution computing device 110 and receive complementary products (e.g., available insurance policies associated with whatever product or service is offered by the product source). These complementary products may require certain data and be automatically activated upon that data being provided.

In one example, a personal mobility service provider may offer a product including a scooter or bike rental ride. The personal mobility service provider may collect data from a user (e.g., within an interface of a software application) and transmit that data to product distribution computing device 110. Some required data may include user identification information and/or an opt-in to provide telematics and/or geolocation data during the scooter or bike rental ride. Location monitoring module 212 (and/or any other module) may confirm that all required data has been provided, and messaging module 214 may transmit back to the personal mobility service provider an on-demand PMP that will cover the user for their scooter or bike rental ride.

As another example, a car dealer may offer a product including a vehicle for sale. The car dealer computing device may collect data from a user (e.g., within an interface of a software application) and transmit that data to the product distribution computing device. Some required data may include user identification information and vehicle identification information. Location monitoring module 212 (and/or any other module) may confirm that all required data has been provided, and messaging module 214 may transmit back to the car dealer computing device vehicle insurance policy (or a quote therefor) for vehicle insurance for the user and the vehicle Location monitoring module 212 may be configured to determine how often to receive (or retrieve/request/access) the user's geolocation data, based upon, for example, telematics data received from user computing device 108. In one exemplary embodiment, the real-time geolocation data may be received from the user's computing device 108 at a first frequency over the interval of time. Location monitoring module 212 may use the telematics data to determine a speed and heading of the user computing device over the interval of time, and, based the real-time geolocation data, speed, and heading, determine that future geolocation data should be received at a second frequency (e.g., less frequently or more frequently). Upon such a determination, messaging module 212 may transmit instructions to user computing device 108 to transmit the real-time location data at the second frequency for a subsequent interval of time.

In some instances, a user may enter or approach a geofence 228 that indicates the geolocation should be retrieved at a greater or reduced frequency. For example, a user may be leaving a city and driving through (or otherwise travelling through) a much less populated area. In such cases, location monitoring module 212 may have been receiving geolocation data from user computing device 108 every minute or every five minutes, when the user was in the city. When location monitoring module 212 determines (e.g., based upon the geolocations data, the speed, and/or the heading) the user has left the city, location monitoring module 212 may determine that geolocation data is only needed (or requested/accessed) in ten- or fifteen-minute intervals, without losing accuracy. That is, the user is considered likely to remain in the less populated area for longer periods of time, and therefore geolocation data is needed less frequently to determine or estimate the user's location.

Conversely, location monitoring module 212 may determine (e.g., based upon the geolocation data, the speed, and/or the heading) the user is nearing a city (or another location of interest, such as a highway junction) from a less-populated area, location monitoring module 212 may determine that geolocation data is needed on a more frequent basis (e.g., every five minutes or every minute) to accurately monitor the user's location and/or behavior.

In some such embodiments, location monitoring module 212 may receive or define geofences 228 (or other boundaries) between areas that define how frequently to pull or receive location data. Location monitoring module 212 may leverage AI/DL module 210 to implement artificial intelligence or machine learning techniques to determine or define these boundaries. For example, boundaries may be determined based upon points of interest, traffic data, accident data, crime data, population data, and the like.

Location monitoring module 212 may leverage AI/DL module 210 to implement machine learning and/or artificial intelligence techniques to determine the user's location based upon the geolocation data received at any frequency (including reduced frequency geolocation data). For example, based upon the geolocation data, the speed, and/or the heading, location monitoring module 212 may leverage AI/DL module 210 to determine the user's location with a particular confidence level. In a situation where a user is in a remote location, travelling at a particular speed on a highway in a first direction, the location of the user may be determined with a 95% confidence level even when only receiving the user's geolocation data every fifteen or twenty minutes.

Location monitoring module 212 may also be configured to factor additional variables into the determination of when to push an offer for a product to a user (and/or activate a product). Location monitoring module 212 may leverage AI/DL module 210 to learn what products a user currently has and/or how they use those products (e.g., how/where a user has insurance coverage), as well as products the user may lack (e.g., coverage in certain areas the user travels to and/or certain activities the user undertakes). Location monitoring module 212 may leverage the user's (real-time and/or historical) geolocation and/or telematics data, user data defining which product(s) a user already has or accesses, and/or environmental data (e.g., traffic data, weather data, crime data, insurance claim data, etc.) in these analyses to determine whether a user has sufficient coverage or should have a product (e.g., an on-demand policy, a PMP, an increase in liability coverage) pushed to the user.

In one example, location monitoring module 212 may leverage AI/DL module 210 to determine that a user occasionally (or frequently) visits a certain location that, based upon environmental data, requires more liability coverage than the user currently has. In such cases, messaging module 214 may push a supplemental policy or an increase in their current insurance policy to the user. As another example, location monitoring module 212 may determine that the user is accessing personal mobility vehicles, such as scooters, but their automobile insurance policy would not cover these activities. In such cases, messaging module 214 may push a PMP to the user to cover these activities.

The products pushed or offered to the user by product distribution computing device 110 may be time-limited or activity-limited, based upon the user's actual activities or plans. For example, the PMP may only be active when the user is in the city in which they use the personal mobility vehicles, or only on weekends when the user is actually using the personal mobility vehicles. As another example, where a user is renting a vehicle (e.g., a rental car), the user's automobile policy may not cover the vehicle and/or usage thereof. Messaging module 214 may transmit an offer to the user for a supplemental policy product that would cover the user for the length of the rental period.

In some embodiments of the present disclosure, location monitoring module 212 may leverage AI/DL module 210 to leverage geolocation and/or telematics data for existing consumers of a product to determine whether the product should be offered to a potential new consumer and, if so, with what parameters (e.g., cost, coverage level, variables, deductibles, endorsements, riders, etc.). In these embodiments, location monitoring module 212 may receive, access, and/or process historical geolocation and/or telematics data for a plurality of existing consumers. Location monitoring module 212 may store, in database 116, the geolocation data 220 and telematics data 222 associated with the plurality of existing consumers of the product within a particular geographic area. As described herein, geolocation data 220 may be captured at a location sensor of a respective user computing device of each existing consumer, the telematics data 222 is captured at a plurality of sensors (e.g., accelerometers, GPS sensors, directional sensors, etc.) of the respective user computing device 108 of each existing consumer and is representative of, in the exemplary embodiment, the driving behavior of each existing consumer.

Location monitoring module 212 may further store a tiered ranking of the plurality of existing consumers. More specifically, each existing consumer may be ranked in one tier of a plurality of tiers, based at least in part upon their telematics data (e.g., their driving behavior), and, in some embodiments, environmental data 224 (e.g., crime data, accident data, insurance claim data, etc.). The tiers may include a top or preferred tier, indicating consumers in this tier have above-standard driving behavior; a middle or standard tier, where consumers in this tier have average or standard driving behavior; and/or a low or below-standard tier, where consumers in this tier have below-average or below-standard driving behavior (e.g., riskier driving behavior).

It should be readily understood that there may be greater than three tiers or fewer than three tiers. Each tier may have different parameters of products associated therewith. For example, insurance products offered to consumers in different tiers may have different prices (e.g., premium or deductible costs), coverage levels, and the like. In some embodiments, location monitoring module 212 receives and stores the tiered rankings from an external source (e.g., an insurance server 114). Alternatively, location monitoring module 212 may leverage AI/DL module 210 to determine the tiered rankings based upon telematics data 222 (and/or environmental data 224 for the geographic area).

Moreover, location monitoring module 212 may leverage AI/DL module 210 to identify one or more shared parameters that are shared by existing consumers within each tier. The parameters may not be shared by every consumer within the tier but may be shared by a majority, significant portion, plurality, etc. of the consumers within the tier. The parameters may represent particular behaviors (e.g., slow acceleration, safer cornering, travel during particular times/days, travel in particular locations or travel that avoids particular locations, etc.) or characteristics (e.g., demographic characteristics, vehicle ownership or usage characteristics, etc.). Each tier may have any number of shared parameters.

A new or potential consumer (a "subject user") of the product (e.g., an insurance policy, in particular an on-demand and/or short-term insurance policy product) may transmit a request to product distribution computing device 110, requesting to become a consumer of the product. The request may include geolocation and/or telematics data associated with the subject user. The geolocation and/or telematics data may be captured by one or more sensors of the subject user's computing device over a period of time preceding the request. Alternatively, the request may include permission for product distribution computing device 110 to access, receive, or retrieve geolocation data and/or telematics data for any interval of time (preceding and/or after the request).

Location monitoring module 212 may then determine, based upon the received (or retrieved/accessed) geolocation data and telematics data from the subject user, whether the subject user shares any set of shared parameters with any tier of existing consumers. The subject user may not need to share all shared parameters in a set of shared parameters for a tier, but may share a plurality or majority of shared parameters. For example, where a tier shares 4 parameters (e.g., they travel to location A, do not travel to location B, travel within the speed limit a threshold percentage of time, and do not travel between 1 AM and 6 AM), the subject user may share 2 or 3 parameters. The subject user may have to share a threshold number of parameters, a threshold percentage of parameters, and/or certain types of parameters in order to be considered to share the set of shared parameters with the tier. Alternatively, the subject user may be considered to share the set of shared parameters with whichever tier the subject shares the most parameters with (e.g., is the most similar to).

Based upon these determinations, location monitoring module 212 "ranks" or "groups" the subject user with one of the tiers, and further determines whether to offer the product to the subject user and, if so, with which product characteristics. In the exemplary embodiment, messaging module 214 transmits an offer of the product to the subject user with product characteristics common to the existing consumers in the same tier (e.g., with an average, median, or standard cost or coverage level). If the subject user is ranked or group into a lower tier (e.g., a tier below some threshold), product distribution computing device 110 may not offer the product to the subject user.

This process may be referred to as "accelerated underwriting" and may be particularly useful for short-term and/or on-demand insurance policies, in which traditional underwriting procedures cannot be performed (e.g., due to time and/or cost constraints). According the present disclosure, a subject user can be offered an insurance product based upon their core similarities with existing consumers. It should be understood that in at least some embodiments, there may be manual actuarial and/or underwriting review and/or monitoring of models and policies generated based upon artificial intelligence, for consideration of both individual model factors and combinations of model factors.

Additionally or alternatively, these processes may be leveraged to generate rankings of a subject user that are transmitted to external sources (e.g., recommendations to TNCs as to whether the subject user may be a good driver). These processes may leverage additional or alternative data, such as data associated with TNC/personal mobility service provider software applications (e.g., UBER/LYFT ratings).

Location monitoring module 212 may leverage AI/DL module 210 to analyze a user's (real-time and/or historical) geolocation and/or telematics data to identify common or repeated locations and/or common or repeated routes for the user. As used herein, a repeated route may include a route the user travels more than a threshold number of times within a certain duration (e.g., within a week, month, or year) and/or a route the user travels with a defined periodicity (e.g., every weekday morning, every Tuesday evening, etc.). Location monitoring module 212 may leverage AI/DL module 210 to identify repeated routes using geolocation and/or telematics data from the user's mobile device and/or connected vehicle. Likewise, repeated locations may include a location at which the user is present more than a threshold number of times within a certain duration and/or a location at which the user is present with a defined frequency or periodicity.

Location monitoring module 212 may to perform the same processes for a plurality of users, and identify users that share the same repeated location. Messaging module 214 may transmit a carpool offer identification message to any of these users, including an identification of the other user(s) with the same repeated location(s), the shared repeated location(s), and a recommendation for the user(s) to carpool. In some embodiments, messaging module 214 may transmit consent request messages to each user prior to sending any carpool offer identification messages, the consent request messages requesting consent from each user to share user information with other users.

Moreover, messaging module 214 may transmit additional messages to and/or receive additional messages from the users. For example, location monitoring module 212 may determine, from the users, which user is a driver and which user(s) is a rider in the driver's vehicle for the carpool, by requesting users to agree to be a driver. It should be recognized that different users may agree to be a driver for different trips and/or for different days. In some embodiments, messaging module 212 may transmit a recommendation that one user agree to be the driver, because the costs associated therewith are lower (e.g., a fuel cost, maintenance cost, and/or insurance cost are lower for that driver and/or their vehicle), or because that user can accommodate more people in their vehicle.

In some embodiments, where the carpool offer is agreed to by multiple users, messaging module 214 may transmit a notification to insurance server 114, identifying the users and the carpool (and, in some cases, the driver(s) and/or their vehicles). In response, insurance server 114 may issue discount(s) or other rewards (e.g., credits, gift cards, charity contributions, etc.) to one or more of the user(s) and/or adjust an insurance policy cost (e.g., a premium cost) for one or more of the user(s). In certain embodiments, messaging module 214 may request this information from insurance server 114 prior to pushing the carpool offer to the users. That is, messaging module 214 may present the potential discounts, rewards, or other benefits to the user to facilitate providing cost savings to the user.

Module 216 may be configured to facilitate maintaining data management app 120 and providing the functionality thereof to users. Module 216 may store instructions that enable the download and/or execution of data management app 120 at user computing devices 108. Module 216 may store instructions regarding user interfaces, controls, commands, settings, and the like, and may format data, such as geolocation data, telematics data, other sensor data, environmental data, various product-related messages, and the like, into a format suitable for transmitting to user computing devices 108 for display thereat.

In the exemplary embodiment, processor 202 may be operatively coupled to communication interface 206 such that product distribution computing device 110 is capable of communicating with remote device(s) such as vehicles 102, user computing devices 108, third party devices 112, and/or insurance servers 114 (all shown in FIG. 1) over a wired or wireless connection. For example, communication interface 206 may receive geolocation, telematics, sensor, and/or environmental data from user computing devices 108, vehicles 102, and/or third-party devices 112. Communication interface 206 may include, for example, a wired or wireless network adapter and/or a wireless data transceiver for use with a mobile telecommunications network.

Processor 202 may also be operatively coupled to database 116 (and/or any other storage device) via storage interface 208. Database 116 may be any computer-operated hardware suitable for storing and/or retrieving data. In some embodiments, database 116 may be integrated in product distribution computing device 110. For example, product distribution computing device 110 may include one or more hard disk drives as database 116.

In other embodiments, database 116 is external to product distribution computing device 110 and is accessed by a plurality of computer devices. For example, database 116 may include a storage area network (SAN), a network attached storage (NAS) system, multiple storage units such as hard disks and/or solid state disks in a redundant array of inexpensive disks (RAID) configuration, cloud storage devices, and/or any other suitable storage device.

Storage interface 208 may be any component capable of providing processor 202 with access to database 116. Storage interface 208 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 202 with access to database 116.

Processor 202 may execute computer-executable instructions for implementing aspects of the disclosure. In some embodiments, processor 202 may be transformed into a special purpose microprocessor by executing computer-executable instructions or by otherwise being programmed. For example, processor 202 may be programmed with the instructions such as those illustrated in FIGS. 8 and 9.

Memory 204 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Exemplary Data Management App

In the exemplary embodiment, product distribution computing device 110 may also maintain data management software application or "app" 120 that enables users to adjust user settings, receive and respond to product-related messages, and access a plurality of services associated with data analysis computer system 100, as described herein. Data management app 120 may be executed on user computing devices 108 and/or in-vehicle computing devices 104, as described elsewhere herein.

In one embodiment, data management app 120 may enable a user to view geolocation data, telematics data, other sensor data, and/or environmental data collected by their vehicle 102 and/or user computing device 108 that is transmitted to product distribution computing device 110. Data management app 120 may further enable the vehicle user to adjust one or more settings, such as user preferences associated with what data is transmitted and/or how often data is transmitted. Data management app 120 may also enable a user to sync profiles or data transmission with other services or apps on their device(s), such as ride-sharing apps, vehicle-rental apps, and the like.

Figure 3:
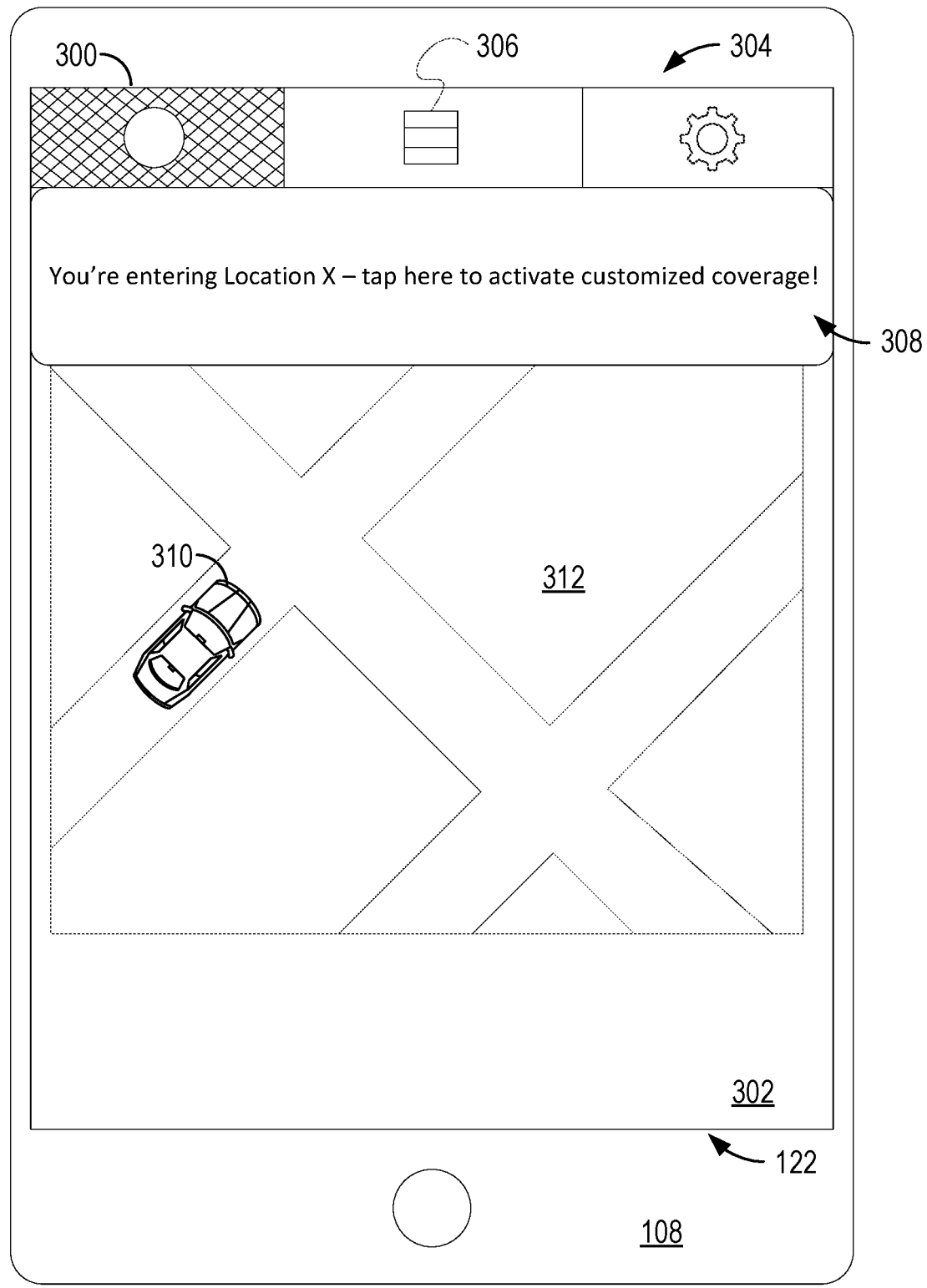
FIG. 3-5 depict exemplary screen captures of a product management software application ("app") maintained using the data analysis computer system shown in FIG. 1.
Figure 4:
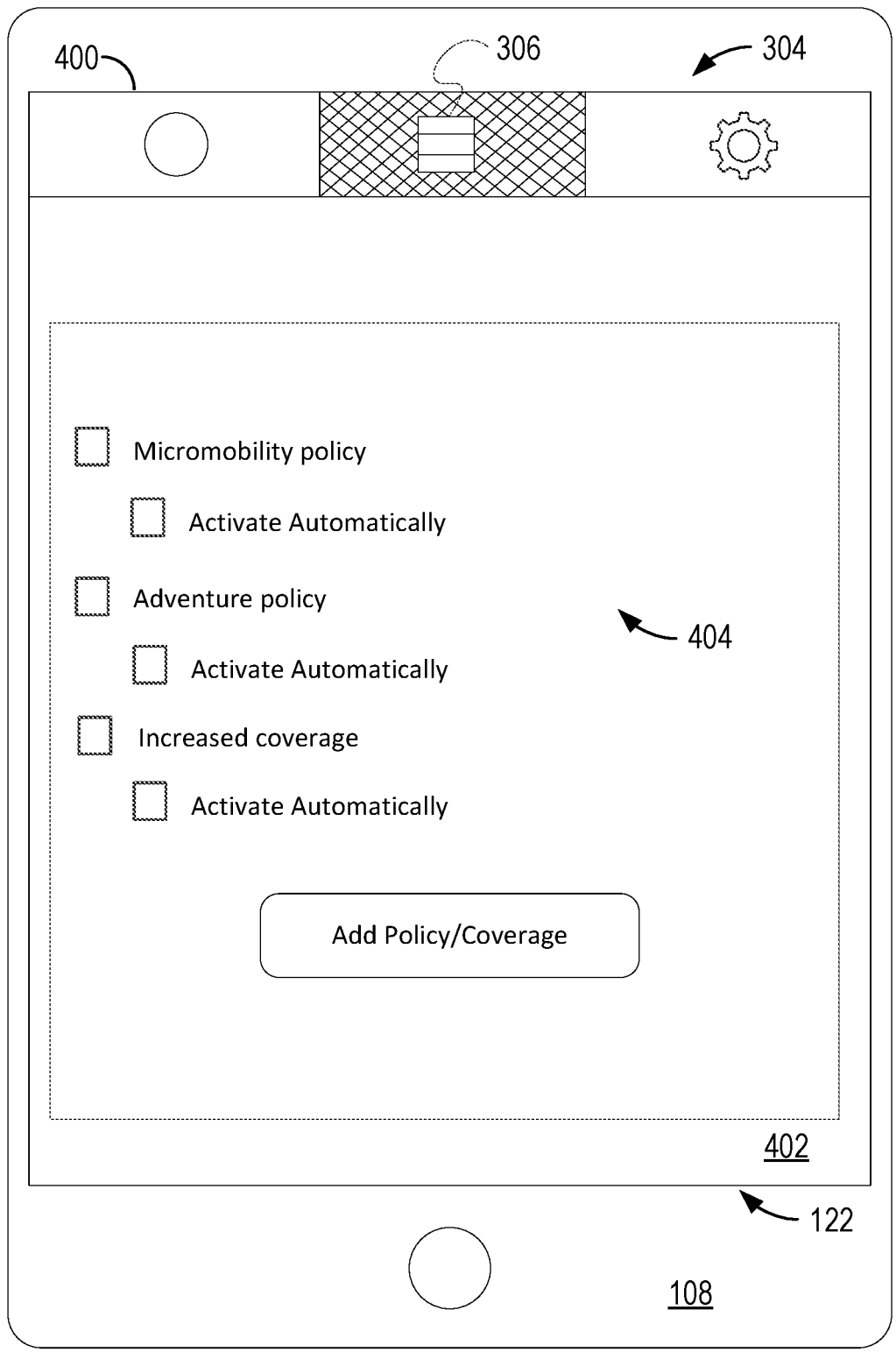
Figure 5:
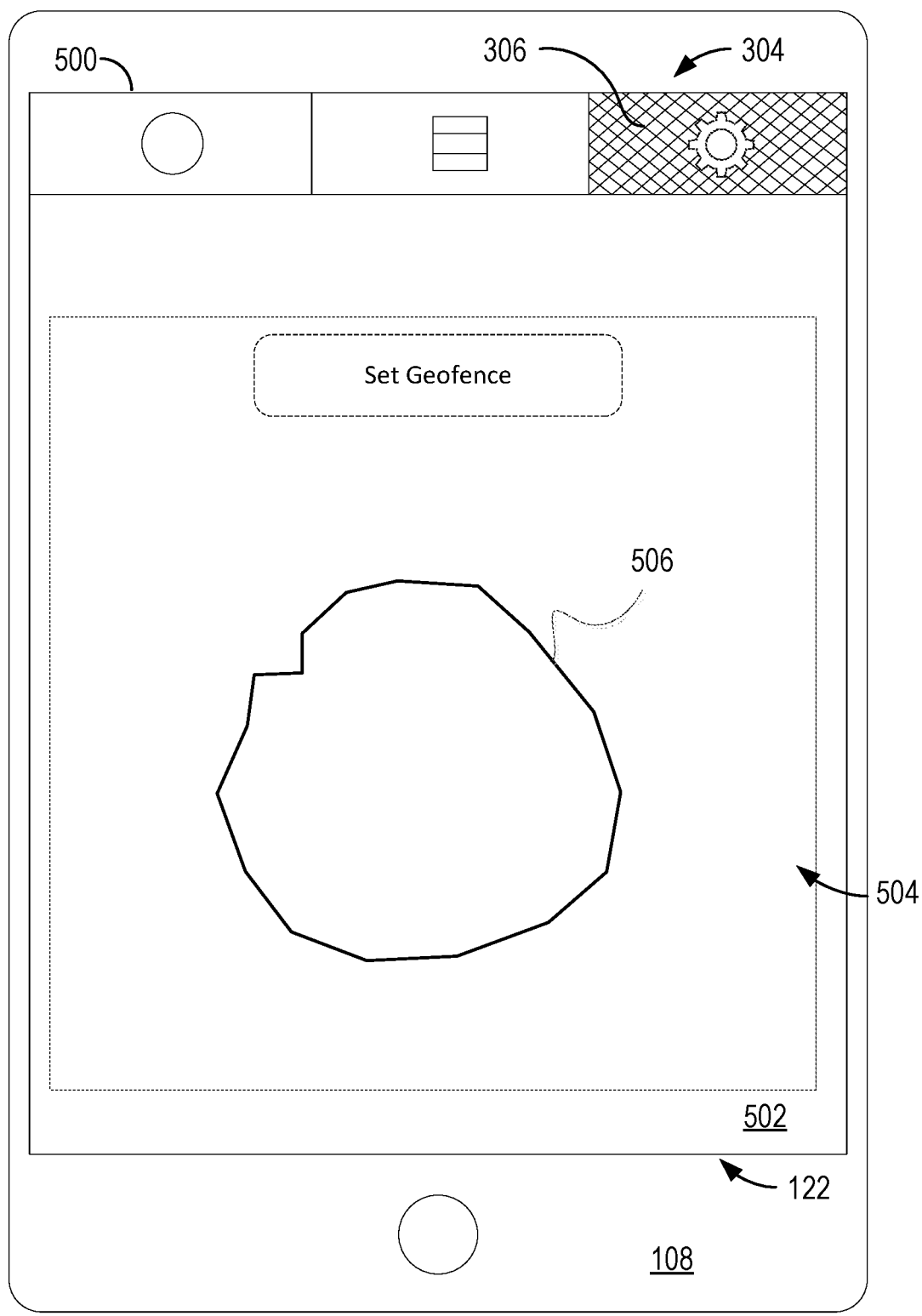

FIGS. 3-5 depict exemplary screen captures or "screenshots" of user interface 122 of data management app 120 as executed on a user computing device 108 (all shown in FIG. 1). The example screenshots include various features and functionalities of data management app 120. In particular, product distribution computing device 110 causes to be displayed at least product-related messages (e.g., product identification messages, offers, alerts, notifications, recommendations, etc.) at user computing device 108, specifically via data management app 120.

More specifically, FIG. 3 depicts a screenshot 300 of a first page 302 accessed by a user within user interface 122 of data management app 120. First page 302 may display a menu 304 of icons 306 that may be selected by the user to access different sections, pages, and/or functionality of data management app 120. It should be readily understood that menu 304 may include additional, fewer, and/or alternative icons 306 that may represent additional, fewer, and/or alternative sections, pages, and/or functionality within data management app 120.

In the illustrated embodiment, the user has selected an icon 306 associated with a Location section to display first page 302. First page 302 displays a current location of user computing device 108 and a travel mode a user of user computing device 108 is travelling under (e.g., using a vehicle, in the case of FIG. 3). The current location is displayed as an icon 310 of the vehicle on a map 312. Also shown is a product identification message 308, embodied as a pop-up or push notification overlaid on map 312. In this example, product identification message 308 includes notification that the user has entered a location in which a product—i.e., customized insurance coverage—is available for activation.

FIG. 4 depicts a screenshot 400 of a second page 402 accessed by a user within user interface 122 of data management app 120. In the illustrated embodiment, the user has selected an icon 306 associated with a Product Preference section to display second page 402. In some cases, second page 402 is displayed upon the user selecting product identification message 308 on first page 302. User interface 122 displays a list of products 404 associated with product identification message 308. The user may select from various insurance policies available thereto, and may select preferences associated with those policies, such as whether to receive offers/notifications associated therewith, and/or to activate those products automatically (e.g., upon entry into a location in which the policy is needed or is relevant to the user's activities/behavior).

FIG. 5 depicts a screenshot 500 of a third page 502 accessed by a user within user interface 122 of data management app 120. In the illustrated embodiment, the user has selected an icon 306 associated with a Settings section to display third page 502. User interface 122 displays an interactive map 504 that enables a user to set their own geofence 506, defining a geographic area about/within which they wish to receive messages (e.g., product offers, alerts, notifications, recommendations, etc.).

Exemplary Geofences

Figure 6:
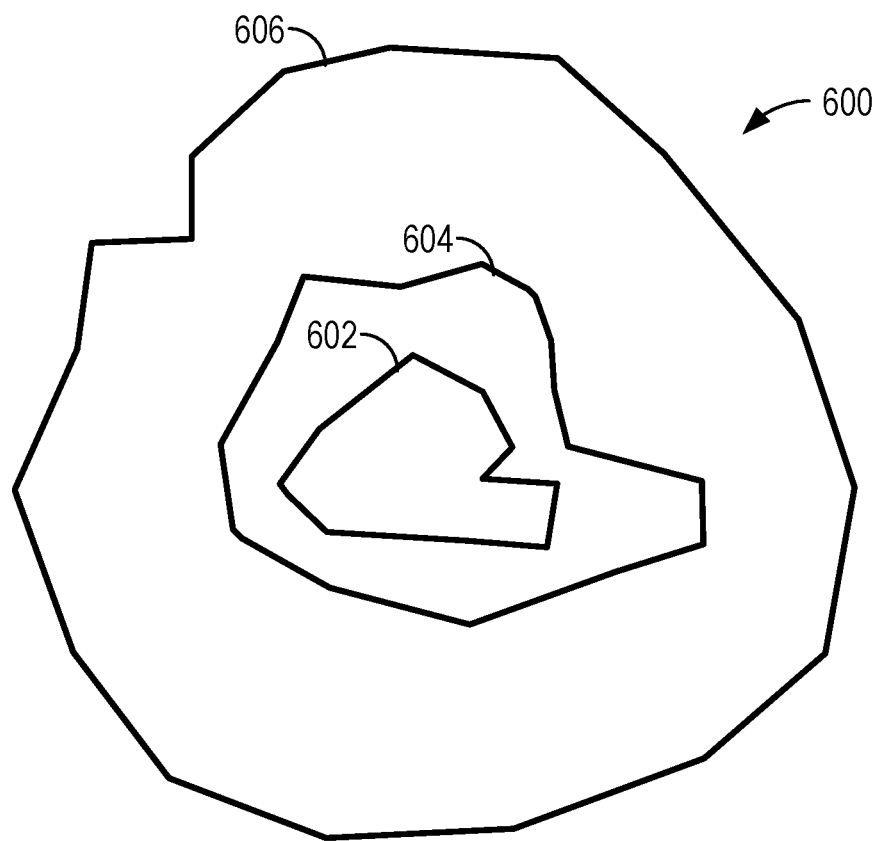
FIG. 6 depicts exemplary geofences that may be used by the data analysis computer system shown in FIG. 1 in accordance with the present disclosure.

FIG. 6 depicts exemplary geofences 600 that may be used by the data analysis computer system 100 shown in FIG. 1 in accordance with the present disclosure. Geofences 600 may be received at product distribution computing device 110 from third party devices 112, insurance servers 114, user computing devices 108, and the like. Additionally or alternatively, product distribution computing device 110 may generate geofences 600 (statically or dynamically). Product distribution computing device 110 may store geofences 600 in database 116.

Geofences 600 may define, for example, various product availability locations and/or boundaries across which geolocation data may be received, retrieved, or accessed from user computing devices 108 at different frequencies. For example, where a first geofence 602 is associated with a city (or other location of interest), user computing device 108 may send geolocation data to product distribution computing device 110 at a first frequency (e.g., every second, every thirty seconds, every minute, etc.). When user computing device 108 exits first geofence 602 and is within a second geofence 604 (which may represent, for example, a suburban area), user computing device 108 may send geolocation data to product distribution computing device 110 at a second, lower frequency (e.g., every five minutes). When user computing device 108 exits second geofence 604 and is within a third geofence 606 (which may represent, for example, a rural area), user computing device 108 may send geolocation data to product distribution computing device 110 at a third, still lower frequency (e.g., every ten minutes, every thirty minutes, etc.). Geofences 600 are defined such that location tracking of user computing device 108 remains sufficiently accurate but a reduction in messaging frequency (and, therefore, a reduction of the burden on the battery and communication interface of user computing device 108) is enabled.

Exemplary User Computer Device

Figure 7:
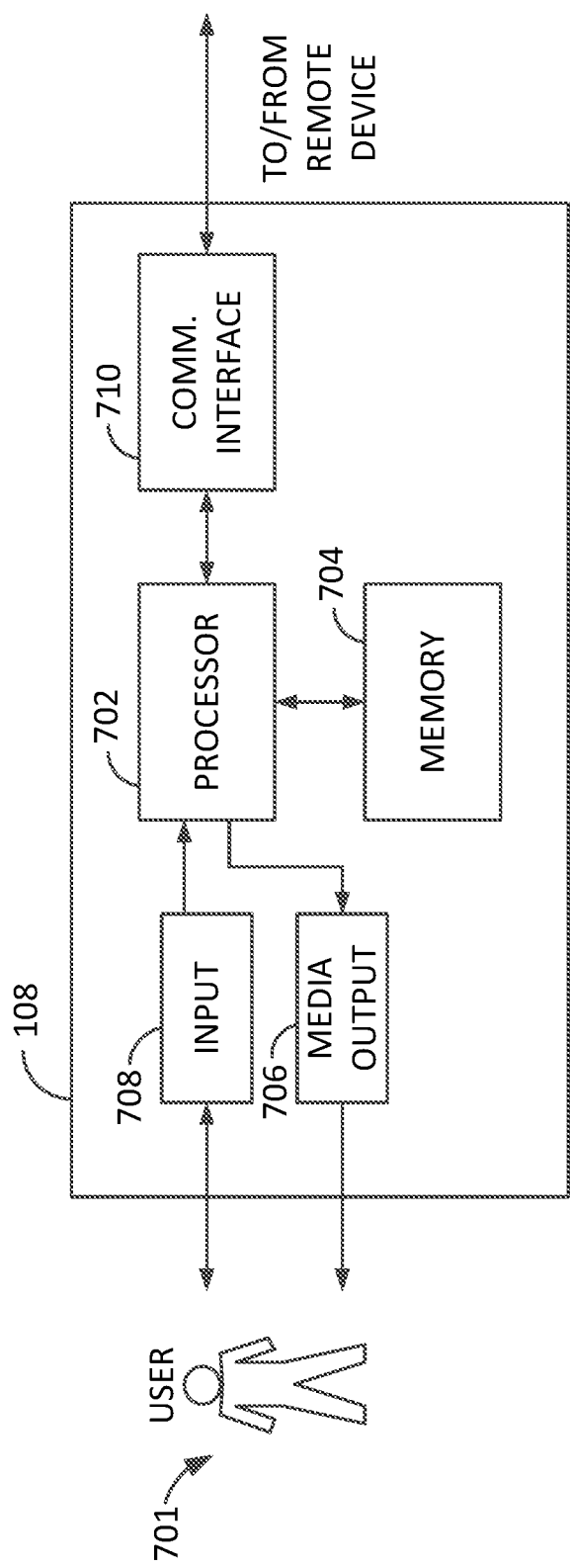
FIG. 7 illustrates a schematic diagram of an exemplary user computing device that may be used in the data analysis computer system shown in FIG. 1.

FIG. 7 depicts an exemplary configuration of an exemplary user computer device 108 that may be used with data analysis computer system 100 (shown in FIG. 1), in accordance with one embodiment of the present disclosure. User computer device 108 may be operated by a user 701.

User computer device 108 may include a processor 702 for executing instructions. In some embodiments, executable instructions may be stored in a memory area 704. Processor 702 may include one or more processing units (e.g., in a multi-core configuration). Memory area 704 may be any device allowing information such as executable instructions and/or transaction data to be stored and retrieved. Memory area 704 may include one or more computer-readable media. Memory area 704 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

User computer device 108 also may include at least one media output component 706 for presenting information to user 701, such as user interface 122 of data management app 120 (both shown in FIG. 1) when data management app 120 is executed on user computing device 108. Media output component 706 may be any component capable of conveying information to user 701. In some embodiments, media output component 706 may include an output adapter (not shown), such as a video adapter and/or an audio adapter. An output adapter may be operatively coupled to processor 702 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

In some embodiments, user computer device 108 may include an input device 08 for receiving input from user 701. User 701 may use input device 708 to, without limitation, interact with product distribution computing device 110 (both in FIG. 1), receive product-related messages, and the like. Input device 708 may include, for example, a keyboard, a pointing device, a mouse, a stylus, and/or a touch sensitive panel (e.g., a touch pad or a touch screen). A single component such as a touch screen may function as both an output device of media output component 706 and input device 708.

User computer device 108 may also include a communication interface 710, communicatively coupled to a remote device such as product distribution computing device 110. Communication interface 710 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 704 may be, for example, computer-readable instructions for providing a user interface to user 701 via media output component 706 and, optionally, receiving and processing input from input device 708. The user interface may include, among other possibilities, a web browser and/or a client application. Web browsers enable users, such as user 701, to display and interact with media and other information typically embedded on a web page or a website from product distribution computing device 110. A client application (e.g., data management app 120) may allow user 701 to interact with, for example, product distribution computing device 110. For example, instructions may be stored by a cloud service and the output of the execution of the instructions sent to the media output component 706.

Figure 8:
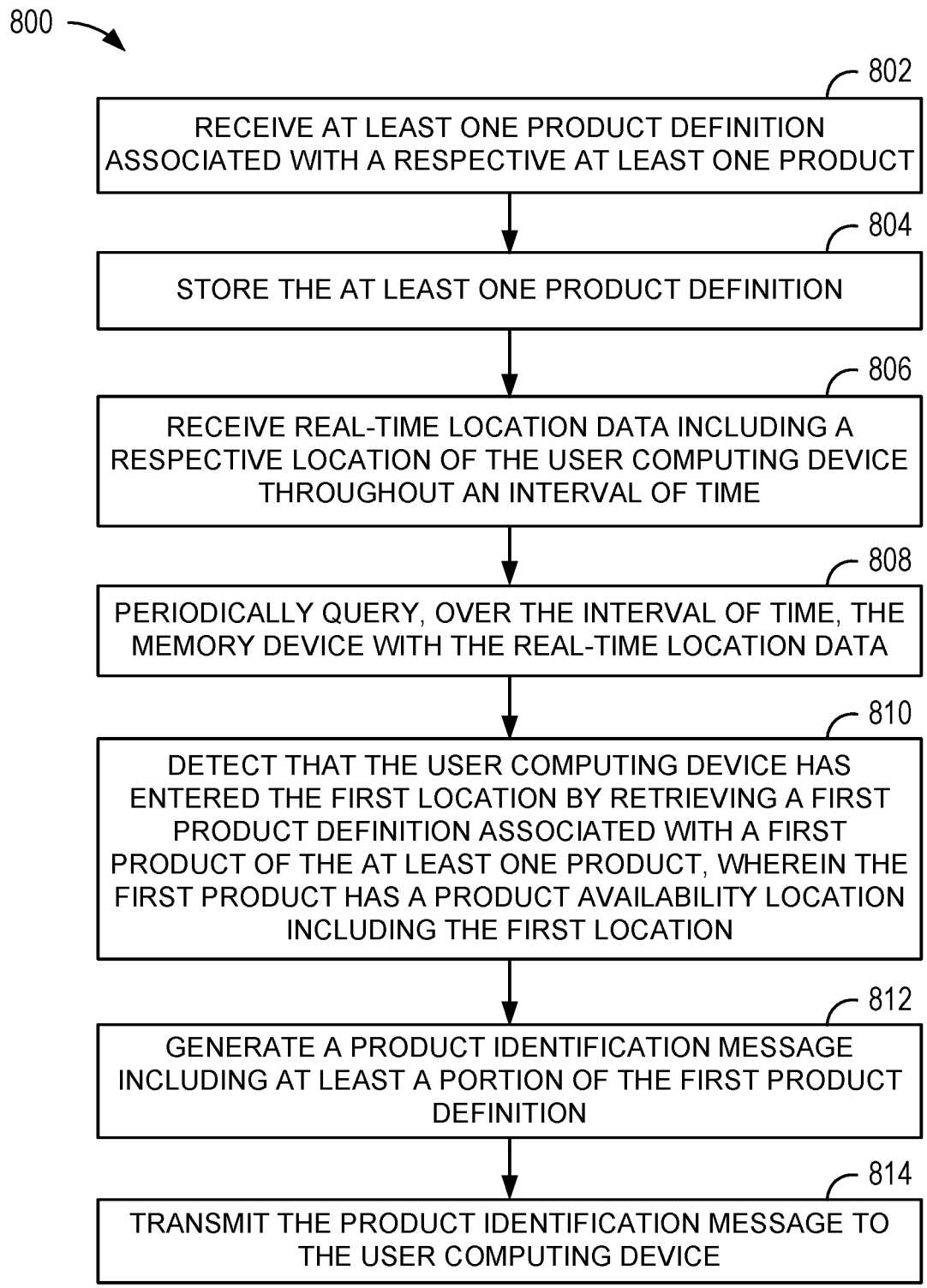
FIG. 8 illustrates a flow chart of an exemplary computer-implemented method for generating on-demand products based upon real-time geolocation data, using the data analysis computer system shown in FIG. 1.

Exemplary Computer-Implemented Method for Generating on-Demand Products Based Upon Real-Time Geolocation Data FIG. 8 depicts a flow chart of an exemplary computer-implemented method 800 for generating on-demand products based upon real-time geolocation data, using data analysis computer system 100 shown in FIG. 1. In the exemplary embodiment, method 800 may be performed by product distribution computing device 110 (shown in FIG. 1).

Method 800 may include receiving 802, from at least one product source, at least one product definition associated with a respective at least one product. Each at least one product definition defines an availability of the respective product and includes a product availability location within which the product is available. Method 800 may also include storing 804 the at least one product definition in a memory device (e.g., database 116, shown in FIG. 1).

Method 800 may also include receiving 806, from a user computing device (e.g., user computing device 108, shown in FIG. 1), real-time location data from at least one location sensor of the user computing device over an interval of time. The real-time location data includes a respective location of the user computing device throughout the interval of time. Method 800 may further include periodically querying 808, over the interval of time, the memory device with the real-time location data. When the user computing device enters a first location, based upon the real-time location data, method 800 may include detecting 810 that the user computing device has entered the first location by retrieving, in response to a successful query of the memory device, a first product definition associated with a first product of the at least one product. The first product has a product availability location including the first location.

Method 800 may further include generating 812 a product identification message including at least a portion of the first product definition, and transmitting 814 the product identification message to the user computing device. The product identification message includes instructions for the user computing device to display the product identification message as a push notification on a user interface of the user computing device.

Method 800 may include fewer, additional, and/or alternative steps. For example, in some embodiments, each product availability location may include a respective geofence, and the corresponding product is available within the geofence. In some such embodiments, the first location is within the geofence associated with the first product, and the product identification message may further include an alert that the user computing device has entered the geofence associated with the first product.

In some such embodiments, method 800 may further include: (i) determining, based upon the real-time location data, that the user computing device has exited the geofence associated with the first product; (ii) generating a second product identification message, the second product identification message including an alert that the user computing device has exited the geofence associated with the first product; and/or (iii) transmitting the second product identification message to the user computing device, the second product identification message including instructions for the user computing device to display the second product identification message as a push notification on the user interface of the user computing device.

In some embodiments, the real-time location data may be received at a first frequency over the interval of time, and method 800 may include: (i) determining a speed and heading of the user computing device over the interval of time; (ii) based upon the real-time location data, speed, and/or heading, determining that future location data should be received at a second frequency; and/or (iii) transmitting instructions to the user computing device to transmit the real-time location data at the second frequency for a subsequent interval of time.

In some such embodiments, method 800 may further include determining the speed and heading of the user computing device over the interval of time by receiving real-time telematics data from the user computing device, the real-time telematics data generated by at least one telematics sensor of the user computing device and including the speed and heading of the user computing device over the interval of time. Further, determining that future location data should be received at a second frequency may include executing machine learning or artificial intelligence techniques using the real-time location data, speed, and/or heading of the user computing device.

In some embodiments, the first product may be associated with an additional or supplemental insurance policy, and/or the first location is associated with high levels of risk or danger, the first product is an additional or supplemental insurance policy that covers the high levels of risk or danger, and the product identification message further includes an identification of the high levels of risk or danger. In other embodiments, the first product may be associated with an event occurring at the first location. In some such embodiments, the first location may include a body of water, and the event may include a weather event.

In some embodiments, method 800 also includes: (i) identifying at least one insurance policy associated with a user of the user computing device; (ii) determining, based upon the location data and environmental data associated with the first location of the user computing device, that the user is underinsured, wherein the first product is an additional or supplemental insurance policy; and/or (iii) generating the product identification message to further include an alert that the user is underinsured, and a selection option that, upon selection by the user on the user interface of the user computing device, enables the user to purchase the first product.

In some embodiments, method 800 includes: (i) receiving location data from the user computing device for a plurality of intervals of time; (ii) identifying at least one repeated location from the location data, wherein the user is present at the repeated location at a regular frequency; (iii) identifying a second user with a shared repeated location; and/or (iv) transmitting a carpool offer identification message to the user computing device, the carpool offer identification message including an identification of the second user, the shared repeated location, and a recommendation to carpool with the second user. Method 800 may include additional, less, or alternative actions, including those discussed elsewhere.

Figure 9:
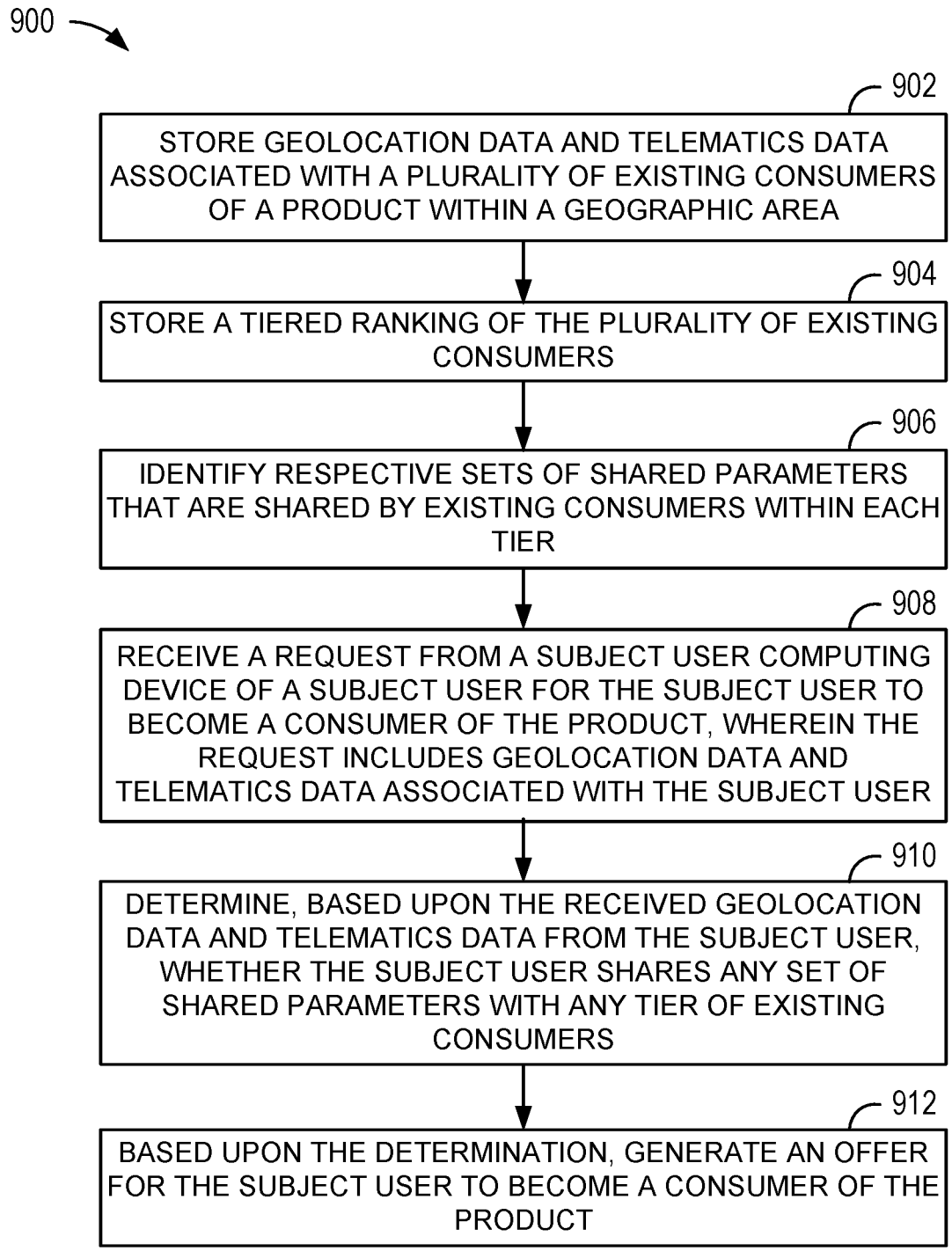
FIG. 9 illustrates a flow chart of an exemplary computer-implemented method for accelerated processing of new consumers of a product, using the data analysis computer system shown in FIG. 1.

Exemplary Computer-Implemented Methods for Accelerated Processing of New Consumers of a Product FIG. 9 depicts a flow chart of an exemplary computer-implemented method 900 for accelerated processing of new consumers of a product, using data analysis computer system 100 shown in FIG. 1. In the exemplary embodiment, method 900 may be performed by product distribution computing device 110 (shown in FIG. 1).

Method 900 may include storing 902, in a memory device (e.g., database 116, shown in FIG. 1), geolocation data and telematics data associated with a plurality of existing consumers of the product within a geographic area. The geolocation data may be captured at a location sensor of a respective user computing device (e.g., user computing device 108, also shown in FIG. 1) of each existing consumer, and the telematics data may be captured at a plurality of sensors of the respective user computing device of each existing consumer and representative of driving behavior of each existing consumer.

Method 900 may also include storing 904, in the memory device, a tiered ranking of the plurality of existing consumers, and identifying 906, from the stored geolocation data and telematics data associated with the plurality of existing consumers and the stored tiered ranking of the plurality of existing consumers, respective sets of shared parameters that are shared by existing consumers within each tier.

Method 900 may include receiving 908 a request from a subject user computing device of a subject user for the subject user to become a consumer of the product. The request may include geolocation data and telematics data associated with the subject user. Method 900 may include determining 910, based upon the received geolocation data and telematics data from the subject user, whether the subject user shares any set of shared parameters with any tier of existing consumers, and based upon the determination, generating 812 an offer for the subject user to become a consumer of the product.

Method 900 may include additional, fewer, and/or alternative steps, including those described herein. For example, in some embodiments, method 900 may also include storing, in the memory device, environmental data associated with the geographic location, and generating the tiered rankings of the plurality of existing consumers based at least in part upon the environmental data. In some such embodiments, the environmental data may include one or more of crime data, insurance claim data, accident data, traffic data, and weather data.

In some embodiments, generating 912 the offer may include: (i) based upon the determination, identifying a first tier with which the subject user shares the set of shared parameters; (ii) identifying product characteristics associated with the existing consumers of the product within the first tier; and/or (iii) generating the offer to include the product characteristics. In some such embodiments, the product characteristics may include a cost of the product for the existing consumers of the product within the first tier. In other such embodiments, the product may include an insurance policy product, and the product characteristics may include a cost of the insurance policy and coverage level of the insurance policy for the existing consumers of the product within the first tier.

In some embodiments, method 900 may also include: (i) receiving a second request from a second subject user computing device of a second subject user for the second subject user to become a consumer of the product, wherein the request includes geolocation data and telematics data associated with the second subject user; (ii) determining, based upon the received geolocation data and telematics data from second the subject user, that the second subject does not shares a set of shared parameters with at least a subset of top tiers of existing consumers; and/or (iii) based upon the determination, declining the second request for the second subject user to become a consumer of the product.

Exemplary Embodiments & Functionality

In one exemplary aspect, a computing device for generating on-demand products based upon real-time geolocation data (and/or computer-executable instructions stored on a non-transitory storage media and readable by the computing device to perform the functions described herein) may be provided. The computing device may include at least one processor and/or an associated transceiver in communication with a memory device. The at least one processor and/or associated transceiver may be programmed to: (i) receive, from at least one product source, at least one product definition associated with a respective at least one product, wherein each at least one product definition defines an availability of the respective product and includes a product availability location within which the product is available; (ii) store the at least one product definition in the memory device; (iii) receive, from a user computing device, real-time location data from at least one location sensor of the user computing device over an interval of time, the real-time location data including a respective location of the user computing device throughout the interval of time; (iv) periodically query, over the interval of time, the memory device with the real-time location data; (v) when the user computing device enters a first location, based upon the real-time location data, detect that the user computing device has entered the first location by retrieving, in response to a successful query of the memory device, a first product definition associated with a first product of the at least one product, wherein the first product has a product availability location including the first location; (vi) generate a product identification message including at least a portion of the first product definition; and/or (vii) transmit the product identification message to the user computing device, the product identification message including instructions for the user computing device to display the product identification message as a push notification on a user interface of the user computing device.

One enhancement may be, wherein each product availability location includes a respective geofence, and wherein the corresponding product is available within the geofence. In some instances, the first location may be within the geofence associated with the first product, and the product identification message further includes an alert that the user computing device has entered the geofence associated with the first product. In some instances, the at least one processor may be further programmed to: (a) determine, based upon the real-time location data, that the user computing device has exited the geofence associated with the first product; (b) generate a second product identification message, the second product identification message including an alert that the user computing device has exited the geofence associated with the first product; and/or (c) transmit the second product identification message to the user computing device, the second product identification message including instructions for the user computing device to display the second product identification message as a push notification on the user interface of the user computing device.

Another enhancement may be, wherein the real-time location data is received at a first frequency over the interval of time, and wherein the at least one processor is further programmed to: (a) determine a speed and heading of the user computing device over the interval of time; (b) based upon the real-time location data, speed, and/or heading, determine that future location data should be received at a second frequency; and/or (c) transmit instructions to the user computing device to transmit the real-time location data at the second frequency for a subsequent interval of time. In some instances, to determine the speed and heading of the user computing device over the interval of time, the at least one processor may be further programmed to receive real-time telematics data from the user computing device, the real-time telematics data generated by at least one telematics sensor of the user computing device and including the speed and heading of the user computing device over the interval of time. In other instances, to determine that future location data should be received at a second frequency, the at least one processor may be further programmed to execute machine learning or artificial intelligence techniques using the real-time location data, speed, and heading of the user computing device.

A further enhancement may be wherein the first product is associated with an additional or supplemental insurance policy.

Another enhancement may be, wherein the first location is associated with high levels of risk or danger, wherein the first product is an additional or supplemental insurance policy that covers the high levels of risk or danger, and wherein the product identification message further includes an identification of the high levels of risk or danger.

One enhancement may be, wherein the first product is associated with an event occurring at the first location. In some instances, wherein the first location may include a body of water and the event may include a weather event.

A further enhancement may be, wherein the at least one processor is further programmed to: (a) identify at least one insurance policy associated with a user of the user computing device; (b) determine, based upon the location data and environmental data associated with the first location of the user computing device, that the user is underinsured, wherein the first product is an additional or supplemental insurance policy; and/or (c) generate the product identification message to further include an alert that the user is underinsured and a selection option that, upon selection by the user on the user interface of the user computing device, enables the user to purchase the first product.

Another enhancement may be, wherein the at least one processor is further programmed to: (a) receive location data from the user computing device for a plurality of intervals of time; (b) identify at least one repeated location from the location data, wherein the user is present at the repeated location at a regular frequency; (c) identify a second user with a shared repeated location; and/or (d) transmit a carpool offer identification message to the user computing device, the carpool offer identification message including an identification of the second user, the shared repeated location, and a recommendation to carpool with the second user.

In another exemplary aspect, a computing device for accelerated processing of new consumers of a product (and/or computer-executable instructions stored on a non-transitory storage media and readable by the computing device to perform the functions described herein) may be provided. The computing device may include a memory device and at least one processor programmed to: (i) store, in the memory device, geolocation data and telematics data associated with a plurality of existing consumers of the product within a geographic area, the geolocation data captured at a location sensor of a respective user computing device of each existing consumer, and the telematics data captured at a plurality of sensors of the respective user computing device of each existing consumer and representative of driving behavior of each existing consumer; (ii) store, in the memory device, a tiered ranking of the plurality of existing consumers; (iii) identify, from the stored geolocation data and telematics data associated with the plurality of existing consumers and the stored tiered ranking of the plurality of existing consumers, respective sets of shared parameters that are shared by existing consumers within each tier; (iv) receive a request from a subject user computing device of a subject user for the subject user to become a consumer of the product, wherein the request includes geolocation data and telematics data associated with the subject user; (v) determine, based upon the received geolocation data and telematics data from the subject user, whether the subject user shares any set of shared parameters with any tier of existing consumers; and/or (vi) based upon the determination, generate an offer for the subject user to become a consumer of the product.

One enhancement may be, wherein the at least one processor is further programmed to: (a) store, in the memory device, environmental data associated with the geographic location; and/or (b) generate the tiered rankings of the plurality of existing consumers based at least in part upon the environmental data. In some instances, the environmental data may include one or more of crime data, insurance claim data, accident data, traffic data, and weather data.

Another enhancement may be, wherein to generate the offer, the at least one processor is further programmed to: (a) based upon the determination, identify a first tier with which the subject user shares the set of shared parameters; (b) identify product characteristics associated with the existing consumers of the product within the first tier; and/or (c) generate the offer to include the product characteristics. In some instances, the product characteristics may include a cost of the product for the existing consumers of the product within the first tier. In other instances, the product may include an insurance policy product, and the product characteristics may include a cost of the insurance policy and coverage level of the insurance policy for the existing consumers of the product within the first tier.

A further enhancement may be, wherein the at least one processor is further programmed to: (a) receive a second request from a second subject user computing device of a second subject user for the second subject user to become a consumer of the product, wherein the request includes geolocation data and telematics data associated with the second subject user; (b) determine, based upon the received geolocation data and telematics data from second the subject user, that the second subject does not shares a set of shared parameters with at least a subset of top tiers of existing consumers; and/or (c) based upon the determination, decline the second request for the second subject user to become a consumer of the product.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as historical geolocation data, telematics data, traffic data, crime data, accident data, insurance claim data, weather data, event data, and the like. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract trends and/or patterns in user behavior, relative to geolocation, telematics, and/or environmental data, that may then be used to generate product offers, alert, notifications, recommendations, and the like.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), SD card, memory device and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer-readable medium. In one exemplary embodiment, the system is executed on a single computer system, without requiring a connection to a server computer. In a further exemplary embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. The following detailed description illustrates embodiments of the disclosure by way of example and not by way of limitation. It is contemplated that the disclosure has general application to providing an on-demand ecosystem in industrial, commercial, and residential applications.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process may also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computing device for generating on-demand products based upon real-time geolocation data, the computing device comprising at least one processor in communication with a memory device, the at least one processor programmed to:
    receive, from at least one product source, at least one product definition associated with a respective at least one location-specific insurance product, wherein each at least one product definition defines an availability of the respective location-specific insurance product and includes a product availability location including a respective geofence within which the location-specific insurance product is available;
    store the at least one product definition in the memory device;
    receive, from a user computing device, real-time telematics data from the user computing device over an interval of time, the real-time telematics data including real-time speed data, real-time heading data, and real-time location data collected by at least one location sensor of the user computing device over an interval of time and identifying a speed, heading, and location, respectively, of the user computing device throughout the interval of time;
    periodically query, over the interval of time, the memory device with the real-time location data;
    in response to a query including the real-time location of the user computing device, receive, from the memory device, a first product definition when the user computing device has at least one of a first speed or a first heading and enters a first location, the first product definition associated with a first insurance product of the at least one location-specific insurance product, wherein the first insurance product is specific to the first location and has a product availability location including the first location within a corresponding first geofence;
    determine, based upon the receipt of the first product definition, that the location of the user computing device corresponds to the first location at which the first insurance product is available;
    generate a first product identification message including at least a portion of the first product definition and a first alert that the user computing device has entered the geofence associated with the first insurance product;
    transmit the first product identification message to the user computing device, the first product identification message including instructions for the user computing device to display the first product identification message including the first alert as a push notification on a user interface of the user computing device; and automatically provide the first insurance product to a user of the user computing device, based upon a preset preference of the user.

2. The computing device of claim 1, wherein the real-time telematics data is received at a first frequency over the interval of time, and wherein the at least one processor is further programmed to:

based upon the real-time telematics data, determine that future telematics data should be received at a second frequency; and transmit instructions to the user computing device to transmit the real-time telematics data at the second frequency for a subsequent interval of time.

3. The computing device of claim 2, wherein to determine that future telematics data should be received at a second frequency, the at least one processor is further programmed to execute machine learning or artificial intelligence techniques using the real-time telematics data of the user computing device.

4. The computing device of claim 1, wherein the first insurance product is associated with an additional or supplemental insurance policy.

5. The computing device of claim 1, wherein the first location is associated with high levels of risk or danger, wherein the first insurance product is an additional or supplemental insurance policy that covers the high levels of risk or danger, and wherein the product identification message further includes an identification of the high levels of risk or danger.

6. The computing device of claim 1, wherein the first insurance product is associated with an event occurring at the first location.

7. The computing device of claim 6, wherein the first location includes a body of water and the event includes a weather event.

8. The computing device of claim 1, wherein the at least one processor is further programmed to:

identify at least one insurance policy associated with a user of the user computing device;

determine, based upon the location data and environmental data associated with the first location of the user computing device, that the user is underinsured, wherein the first insurance product is an additional or supplemental insurance policy; and generate the first product identification message to further include an alert that the user is underinsured and a selection option that, upon selection by the user on the user interface of the user computing device, enables the user to purchase the first insurance product.

9. The computing device of claim 1, wherein the at least one processor is further programmed to:

receive location data from the user computing device for a plurality of intervals of time;

identify at least one repeated location from the location data, wherein the user is present at the repeated location at a regular frequency;

identify a second user with a shared repeated location; and transmit a carpool offer identification message to the user computing device, the carpool offer identification message including an identification of the second user, the shared repeated location, and a recommendation to carpool with the second user.

10. A computer-implemented method for generating on-demand products based upon real-time geolocation data, the method implemented by a computing device including at least one processor in communication with at least one memory device, the method comprising:

receiving, from at least one product source, at least one product definition associated with a respective at least one location-specific insurance product, wherein each at least one product definition defines an availability of the respective location-specific insurance product and includes a product availability location including a respective geofence within which the location-specific insurance product is available;

storing the at least one product definition in the memory device;

receiving, from a user computing device, real-time telematics data from the user computing device over an interval of time, the real-time telematics data including real-time speed data, real-time heading data, and real-time location data collected by at least one location sensor of the user computing device over an interval of time and identifying a speed, heading, and location, respectively, of the user computing device throughout the interval of time;

periodically querying, over the interval of time, the memory device with the real-time location data;

in response to a query including the real-time location of the user computing device, receiving, from the memory device, a first product definition when the user computing device has at least one of a first speed or a first heading and enters a first location, the first product definition associated with a first insurance product of the at least one location-specific insurance product, wherein the first insurance product is specific to the first location and has a product availability location including the first location within a corresponding first geofence;

determining, based upon the receipt of the first product definition, that the location of the user computing device corresponds to the first location at which the first insurance product is available;

generating a first product identification message including at least a portion of the first product definition and a first alert that the user computing device has entered the geofence associated with the first insurance product;

transmitting the first product identification message to the user computing device, the first product identification message including instructions for the user computing device to display the first product identification message including the first alert as a push notification on a user interface of the user computing device; and automatically providing the first insurance product to a user of the user computing device, based upon a preset preference of the user.

11. The computer-implemented method of claim 10, wherein the real-time telematics data is received at a first frequency over the interval of time, the method further comprising:

based upon the real-time telematics data, determining that future telematics data should be received at a second frequency; and transmitting instructions to the user computing device to transmit the real-time telematics data at the second frequency for a subsequent interval of time.

12. The computer-implemented method of claim 11, wherein determining that future telematics data should be received at a second frequency comprises executing machine learning or artificial intelligence techniques using the real-time telematics data of the user computing device.

13. The computer-implemented method of claim 10, further comprising:
identifying at least one insurance policy associated with a user of the user computing device;
determining, based upon the location data and environmental data associated with the first location of the user computing device, that the user is underinsured, wherein the first insurance product is an additional or supplemental insurance policy; and
generating the first product identification message to further include an alert that the user is underinsured and a selection option that, upon selection by the user on the user interface of the user computing device, enables the user to purchase the first insurance product.

14. The computer-implemented method of claim 10, further comprising:
receiving location data from the user computing device for a plurality of intervals of time;
identifying at least one repeated location from the location data, wherein the user is present at the repeated location at a regular frequency;
identifying a second user with a shared repeated location; and
transmitting a carpool offer identification message to the user computing device, the carpool offer identification message including an identification of the second user, the shared repeated location, and a recommendation to carpool with the second user.

15. At least one non-transitory computer-readable storage medium having stored thereon computer-executable instructions for generating on-demand products based upon real-time geolocation data, wherein, when executed by at least one processor in communication with at least one memory device, the computer-executable instructions cause the at least one processor to:
receive, from at least one product source, at least one product definition associated with a respective at least one location-specific insurance product, wherein each at least one product definition defines an availability of the respective location-specific insurance product and includes a product availability location including a respective geofence within which the location-specific insurance product is available;
store the at least one product definition in the memory device;
receive, from a user computing device, real-time telematics data from the user computing device over an interval of time, the real-time telematics data including real-time speed data, real-time heading data, and real-time location data collected by at least one location sensor of the user computing device over an interval of time and identifying a speed, heading, and location, respectively, of the user computing device throughout the interval of time;
periodically query, over the interval of time, the memory device with the real-time location data;
in response to a query including the real-time location of the user computing device, receive, from the memory device, a first product definition when the user computing device has at least one of a first speed or a first heading and enters a first location, the first product definition associated with a first insurance product of the at least one location-specific insurance product, wherein the first insurance product is specific to the first location and has a product availability location including the first location within a corresponding first geofence;
determine, based upon the receipt of the first product definition, that the location of the user computing device corresponds to the first location at which the first insurance product is available;
generate a first product identification message including at least a portion of the first product definition and a first alert that the user computing device has entered the geofence associated with the first insurance product;
transmit the first product identification message to the user computing device, the first product identification message including instructions for the user computing device to display the first product identification message including the first alert as a push notification on a user interface of the user computing device; and
automatically provide the first insurance product to a user of the user computing device, based upon a preset preference of the user.

16. The non-transitory computer-readable storage medium of claim 15, wherein the real-time telematics data is received at a first frequency over the interval of time, and wherein the computer-executable instructions further cause the at least one processor to:
based upon the real-time telematics data, determine that future telematics data should be received at a second frequency; and
transmit instructions to the user computing device to transmit the real-time telematics data at the second frequency for a subsequent interval of time.

17. The non-transitory computer-readable storage medium of claim 16, wherein to determine that future telematics data should be received at a second frequency, the computer-executable instructions further cause the at least one processor to execute machine learning or artificial intelligence techniques using the real-time telematics data of the user computing device.

18. The non-transitory computer-readable storage medium of claim 15, wherein the first insurance product is associated with an additional or supplemental insurance policy.

19. The non-transitory computer-readable storage medium of claim 15, wherein the first location is associated with high levels of risk or danger, wherein the first insurance product is an additional or supplemental insurance policy that covers the high levels of risk or danger, and wherein the product identification message further includes an identification of the high levels of risk or danger.

20. The non-transitory computer-readable storage medium of claim 15, wherein the first insurance product is associated with an event occurring at the first location.

* * * * *